United States Patent
Leprevost

(10) Patent No.: US 7,505,883 B2
(45) Date of Patent: Mar. 17, 2009

(54) COMPUTER SIMULATION OF BODY DYNAMICS INCLUDING A SOLVER THAT SOLVES IN LINEAR TIME FOR A SET OF CONSTRAINTS

(75) Inventor: Jean-Christophe Leprevost, Guildford (GB)

(73) Assignee: Electronic Arts Inc., Redwood City, CA (US)

( * ) Notice: Subject to any disclaimer, the term of this patent is extended or adjusted under 35 U.S.C. 154(b) by 271 days.

(21) Appl. No.: 11/388,778

(22) Filed: Mar. 23, 2006

(65) Prior Publication Data
US 2006/0217945 A1  Sep. 28, 2006

Related U.S. Application Data

(60) Provisional application No. 60/664,901, filed on Mar. 23, 2005.

(51) Int. Cl.
*G06F 17/10* (2006.01)
*G06T 13/00* (2006.01)
(52) U.S. Cl. ............................ 703/2; 345/419; 345/474
(58) Field of Classification Search ................... 703/2, 703/6; 345/419, 473, 474
See application file for complete search history.

(56) References Cited

U.S. PATENT DOCUMENTS

| | | | | |
|---|---|---|---|---|
| 5,249,151 A | * | 9/1993 | Chang et al. | 703/7 |
| 5,424,963 A | * | 6/1995 | Turner et al. | 703/6 |
| 2003/0179205 A1 | * | 9/2003 | Smith et al. | 345/474 |
| 2004/0169656 A1 | | 9/2004 | Piponi et al. | |
| 2004/0210426 A1 | | 10/2004 | Wood | |
| 2005/0187742 A1 | * | 8/2005 | Collodi | 703/2 |

OTHER PUBLICATIONS

International Search Report dated Oct. 5, 2007, received in international patent application S.N. PCT/US2006/010820, filed Mar. 23, 2006.

* cited by examiner

*Primary Examiner*—Russell Frejd
(74) *Attorney, Agent, or Firm*—Philip H. Albert; Townsend and Townsend and Crew LLP

(57) ABSTRACT

Computer simulation of the dynamics of rigid bodies interacting through collisions, stacks and joints is performed using a constraint-based system in which constraints are defined in terms of the positions of the bodies. Displacements caused by reaction forces necessary to ensure that the bodies comply with the position constraints can be calculated and can be done iteratively by updating equations defining the reaction forces and the displacements such that the computation time and memory resources required to perform the calculations is linearly dependent upon the number of bodies and the number of contacts and joints between the bodies.

11 Claims, 12 Drawing Sheets

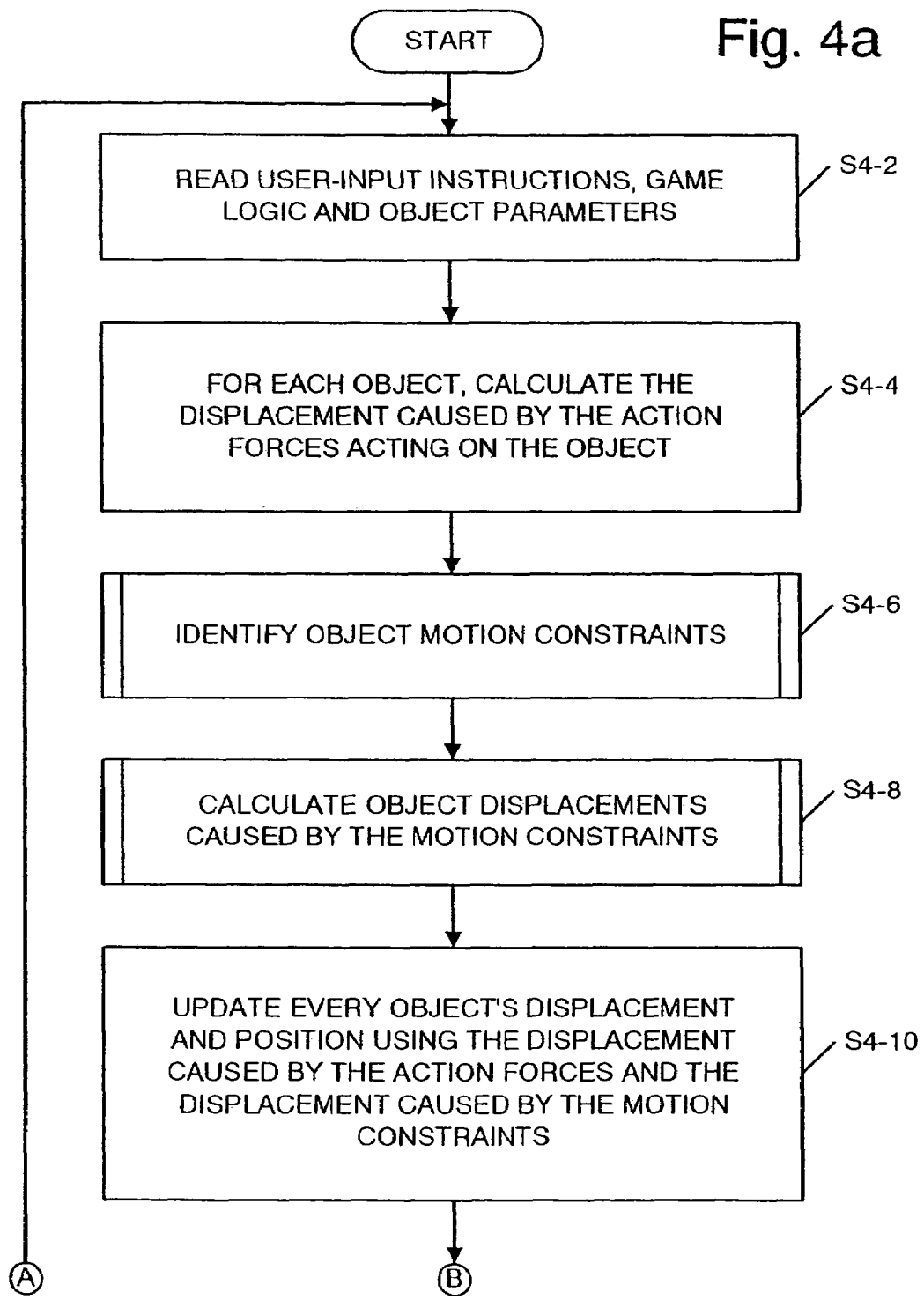

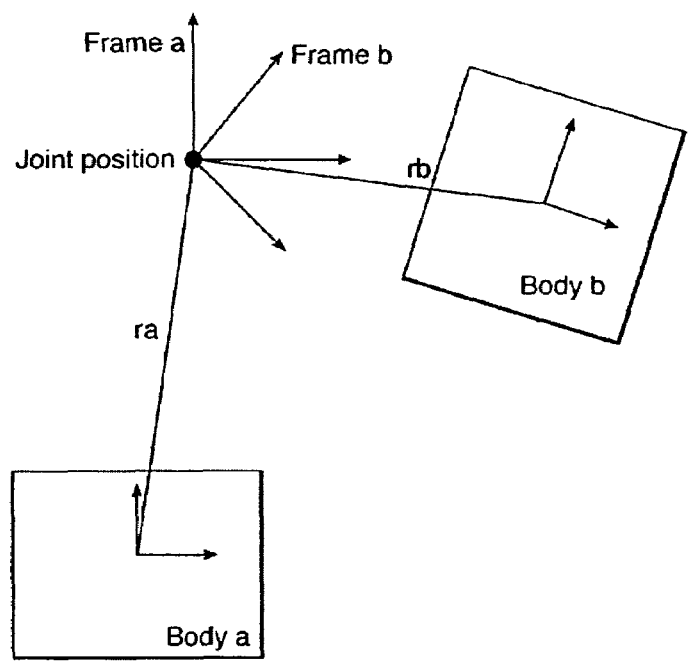
Fig. 11
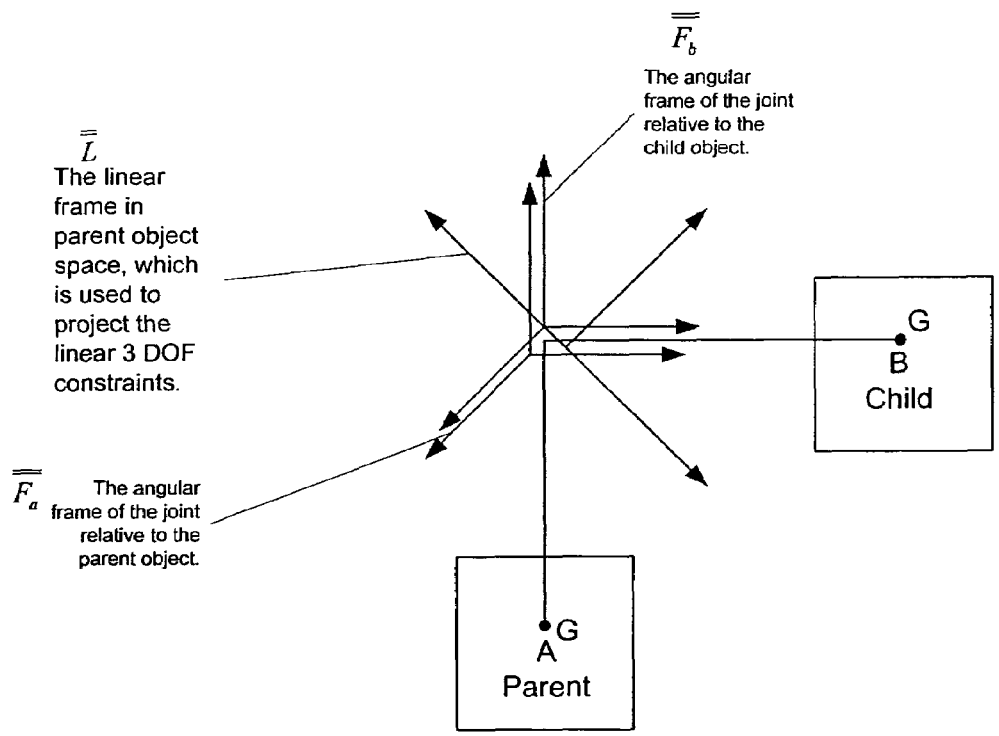
Fig. 12 - Example of a 6 DOF locked joint

COMPUTER SIMULATION OF BODY DYNAMICS INCLUDING A SOLVER THAT SOLVES IN LINEAR TIME FOR A SET OF CONSTRAINTS

CROSS-REFERENCES TO RELATED APPLICATIONS

This application claims priority from U.S. Provisional Patent Application No. 60/664,901 filed Mar. 23, 2005 entitled "LINEAR SOLVER" which is hereby incorporated by reference, as if set forth in full in this document, for all purposes.

The present application is filed of even date with the following commonly assigned applications/patents:

U.S. patent application Ser. No. 11/388,746 filed Mar. 23, 2006 entitled "COMPUTER SIMULATION OF BODY DYNAMICS INCLUDING A SOLVER THAT SOLVES FOR POSITION-BASED CONSTRAINTS", in the name of Jean-Christophe Leprevost (hereinafter "Leprevost I);

U.S. patent application Ser. No. 11/389,562 filed Mar. 23, 2006 entitled "COMPUTER SIMULATION OF BODY DYNAMICS INCLUDING A SOLVER THAT SOLVES IN LINEAR TIME FOR A SET OF CONSTRAINTS USING VECTOR PROCESSING", in the name of Jean-Christophe Leprevost (hereinafter "Leprevost III);

each of which are hereby incorporated by reference, as if set forth in full in this document, for all purposes.

FIELD OF THE INVENTION

The present invention relates generally to the field of computer processing to simulate dynamics of rigid bodies and in particular to simulate the interaction of rigid bodies in three-dimensional space to produce a realistic display of the bodies, as might be used in computer graphics and animation thereof and for performing certain calculations with effort linearly proportional to the number of rigid bodies.

BACKGROUND OF THE INVENTION

Simulating the dynamics of rigid bodies is important for many applications such as, for example, virtual reality devices, simulators and computer games. To be realistic, the simulation takes into account of the interaction of the bodies through contacts such as collisions and connections. For example, if a video game character was an articulated body with arms and legs and a scene involved that character moving, it would not be realistic if the character's forearm temporarily separated from the character's upper arm at the elbow during a body movement. Thus, a simulation process done by simulator hardware or a programmable system programmed according to simulation instructions (e.g., software, codes, etc.) might operate according to general principles that a designer deems are necessary to result in realistic simulations. For example, a designer might deem that body parts attached at joints shall remain attached, that any moving part be subject to friction or not, that parts have weight and are subject to gravity, etc.

It should be understood that for different applications, different general principles might be in play. For example, for a video game simulating the interaction of sports team players, such as American football, soccer, basketball, etc., some effects that might be present in an actual sporting event do not need to be considered, such as air friction, while in other simulations, such as a simulation of a falling body or a diver diving into water, friction at the surface of the body might be taken into account. That said, once the designer settles on what general principles are needed or desirable to provide the realistic simulation, a task of the simulator is to compute the dynamics taking into account those general principles.

Because "realism" is often subjective and people are typically much better that computer in determining how realistic an animation appears, the reader should understand that "realistic" simulation may refer less to what is perceived by a particular set of individuals as being a realistic simulation and refer more to the simulation processes that comply with the general principles that the designer indicates as being representative of realism. In a very specific example, a designer might determine, possibly by some process not fully described herein, that realistic simulation occurs, for that designer's purposes, if each moving object in a scene is represented by a finite number of rigid bodies having mass and those rigid bodies move consistent with (at least approximations of) rules of physics such as (1) inertia, (2) acceleration occurring when a force is applied to a body wherein the acceleration is equal to the force divided by the mass, (3) two rigid bodies will not simultaneously occupy the same space, (4) bodies in the scene not attached to, or resting on, any other body will fall "down", and so on. It is the role of the simulator to simulate consistent with those general principles, hopefully to provide something that many will consider realistic, but a simulator should not be considered outside of the present definition of a simulator because someone might subjectively determine that its simulations are not realistic looking.

Known Approaches to Rigid-Body Simulation

Many approaches to simulating the interaction of rigid bodies are known. These include constraint-based methods, penalty-based methods, impulse-based methods, collision synchronisation and hybrid methods.

With constraint-based rigid body dynamics simulation, the simulator considers a set of rigid bodies and the forces incident on those bodies to determine how those bodies move from one state to the next (e.g., from one point in time represented by one image of the scene containing those bodies to another point in time represented by a later image of the scene, wherein the sequence of scenes can be displayed in order, to show animation of those bodies). Where there are constraints on bodies, additional forces (constraint reaction forces) are introduced into the system to ensure that the rigid bodies comply with physical constraints on their motion resulting from the interaction of the bodies (for example physical constraints resulting from a collision between bodies or physical constraints resulting from a connection between bodies). The constraint reaction forces may be transient, for example if bodies collide and bounce apart, or they may be persistent, for example if a body rests on another body.

In computer simulation of rigid body dynamics, the movement of the rigid bodies is calculated at discrete times (for example times defined by the frame rate of the display device upon which the positions of the bodies are to be displayed), with the result that each calculation needs to take account of the movement of the bodies and the interaction of the bodies within the predetermined time period since the last calculation (commonly referred to as the "time step"). Simulation is carried out to model changes to the position, velocity and acceleration of the bodies caused by interactions between the bodies within the time step. A particular problem is to prevent bodies from simultaneously occupying the same space at the same time (known as object penetration) by calculating non-penetration constraint forces to keep the objects apart.

Known rigid body constraint-based simulations are either acceleration-based or velocity-based, imposing constraints on the velocity or acceleration of the bodies, respectively and calculating the constraint reaction forces necessary to ensure that the bodies comply with those constraints. The most popular type of constraint-based simulation is velocity-based. Examples of velocity-based methods are described for example in Baraff, D., "Fast Contact Force Computation for Nonpenetrating Rigid Bodies", Computer Graphics Proceedings, Annual Conference Series, SIGGRAPH '94, pp. 23-34 (1994) (hereinafter [Baraff94]") and Baraff, D., "Linear-Time Dynamics Using Lagrange Multipliers", Computer Graphics Proceedings, Annual Conference Series, SIGGRAPH '96, pp. 137-146 (1996) (hereinafter [Baraff96]").

In velocity-based constraint systems, constraints are imposed upon the velocities of interacting rigid bodies at the time the bodies collide, and the constraint reaction forces that are required to maintain the velocities of the bodies within the defined constraints are calculated.

Typically, an equation containing Lagrange multipliers describing the constraint reaction forces is evaluated. Such an equation has the form shown in Equation (1) (see, for example [Baraff94] and [Baraff96]):

$$JM^{-1}J^T\underline{\lambda} \geq \underline{c} \quad (1)$$

where:
 J is a Jacobian matrix for all contacts between all bodies in the simulation
 $M^{-1}$ is the inverse of the mass matrix for all bodies
 $\underline{\lambda}$ is a vector of Lagrange multipliers of the system
 $\underline{C}$ is a vector of the defined velocity constraints
 $J^T\underline{\lambda}$ are the unknown constraint reaction forces acting on the bodies to ensure that the velocities of the bodies satisfy the velocity constraints Evaluating Equation (1) above results in the calculation of $J^T\underline{\lambda}$ defining the constraint reaction forces acting on the bodies to ensure that the bodies' velocities comply with the defined velocity constraints. Following calculation of the constraint reaction forces, the acceleration of each body is calculated using Equation (2) derived from the well-known equations in physics, F=ma, where a is the acceleration of the rigid body, $F_{ext}$ is the known external forces acting on the rigid body (that is, non-constraint forces such as gravity and forces resulting from propulsion simulation, etc.), and m is the individual mass of the rigid body.

$$a = \frac{J^T\underline{\lambda} + F_{ext}}{m} \quad (2)$$

After calculating the acceleration of each body, the velocity of each body is calculated as follows:

$$v^{t+1} = v^t + a.dt \quad (3)$$

where:
 $v^{t+1}$ is the velocity of the body at time t+1
 $v^t$ is velocity of the body at time t
 dt is the time step duration Finally, after calculating the velocity of each body, the position of each body is calculated using Equation (4), where $x^{t+1}$ is the position of the body at time t+1 and $x^t$ is the position of the body at time t.

$$x^{t+1} = x^t + v^{t+1}.dt \quad (4)$$

The approach above suffers from a number of problems, however.

Firstly, the Jacobian matrix J is a very large matrix, because each row contains parameters for only one constraint (for example, one contact) between one pair of bodies. In addition, in scalar format, three rows are necessary for every constraint, and six columns are necessary for every body. As a result, for even a moderately complex system, J can be of a very large size. Calculating the transpose of J is therefore both computationally expensive and memory expensive, even though the calculation itself is straightforward. Further, the memory storage and computation time requirements increase in proportion to the square of the number of constraints represented by J. Evaluation of the transpose of J is therefore particularly problematic for computer game consoles which typically do not provide extensive processing capability or extensive memory.

Secondly, the approach requires all of the equations above to be evaluated, and further requires the evaluation to be carried out in a specific order. More particularly, forces have to be calculated by evaluating Equation (1), then accelerations have to be calculated using the determined forces by evaluating Equation (2), then velocities have to be calculated using the determined accelerations by evaluating Equation (3), and finally positions have to be calculated using the determined velocities by evaluating Equation (4). Not only is this restrictive, but it is also time-consuming.

Thirdly, errors in the calculated positions of the bodies often occur. This is because the velocity constraint applied to the velocity of the two bodies is that $(V_A - V_B).\underline{n} \geq 0$; that is the difference between the velocities of the bodies in a normal direction (perpendicular) to the contact plane is not less than zero in order to prevent the bodies moving closer together. However, this constraint is only valid at the instant in time when the bodies touch—not before when the bodies are apart and not after when the bodies are penetrating. Accordingly, if the instant in time at which the body dynamic equations are evaluated does not correspond exactly to the instant in time at which the bodies touch, then the contact forces calculated by evaluating the equations above cause the bodies to stop and suspend in space with a gap therebetween or cause the bodies to stop with one body penetrating the other.

It is known to solve this position error by subsequently adjusting the positions of the bodies to remove the error. However, not only does this add another step to the computation (increasing the number of processing operations and the processing time), but the movement of the bodies to their corrected positions imparts a velocity to the bodies which results in subsequent errors in the dynamics of the bodies.

Improved simulation was sought to overcome these difficulties.

BRIEF SUMMARY OF THE INVENTION

In embodiments of simulators according to the present invention that simulate motion of a plurality of rigid bodies, constraints on the plurality of rigid bodies are solved by iteratively evaluating a plurality of equalities to calculate a motion parameter complying with the constraints. The equations may relate to a motion parameter and a reaction to the constraints, and the equations may be evaluated separately for each constraint.

The simulator can be embodied in hardware, firmware, software or a combination, a computer program, a data signal, or the like.

The following detailed description together with the accompanying drawings will provide a better understanding of the nature and advantages of the present invention.

BRIEF DESCRIPTION OF THE DRAWINGS

Embodiments of the present invention will now be described, by way of example only, with reference to the accompanying drawings, in which like reference numbers are used to designate like parts, and in which:

FIG. 4, comprising FIGS. 4a and 4b, shows the processing operations performed by the game platform of FIG. 3 during processing to execute the processing instructions of the application product shown in FIG. 2;

FIGS. 11-12 show examples to illustrate joints connecting two bodies.

DETAILED DESCRIPTION OF THE INVENTION

Figure 1:
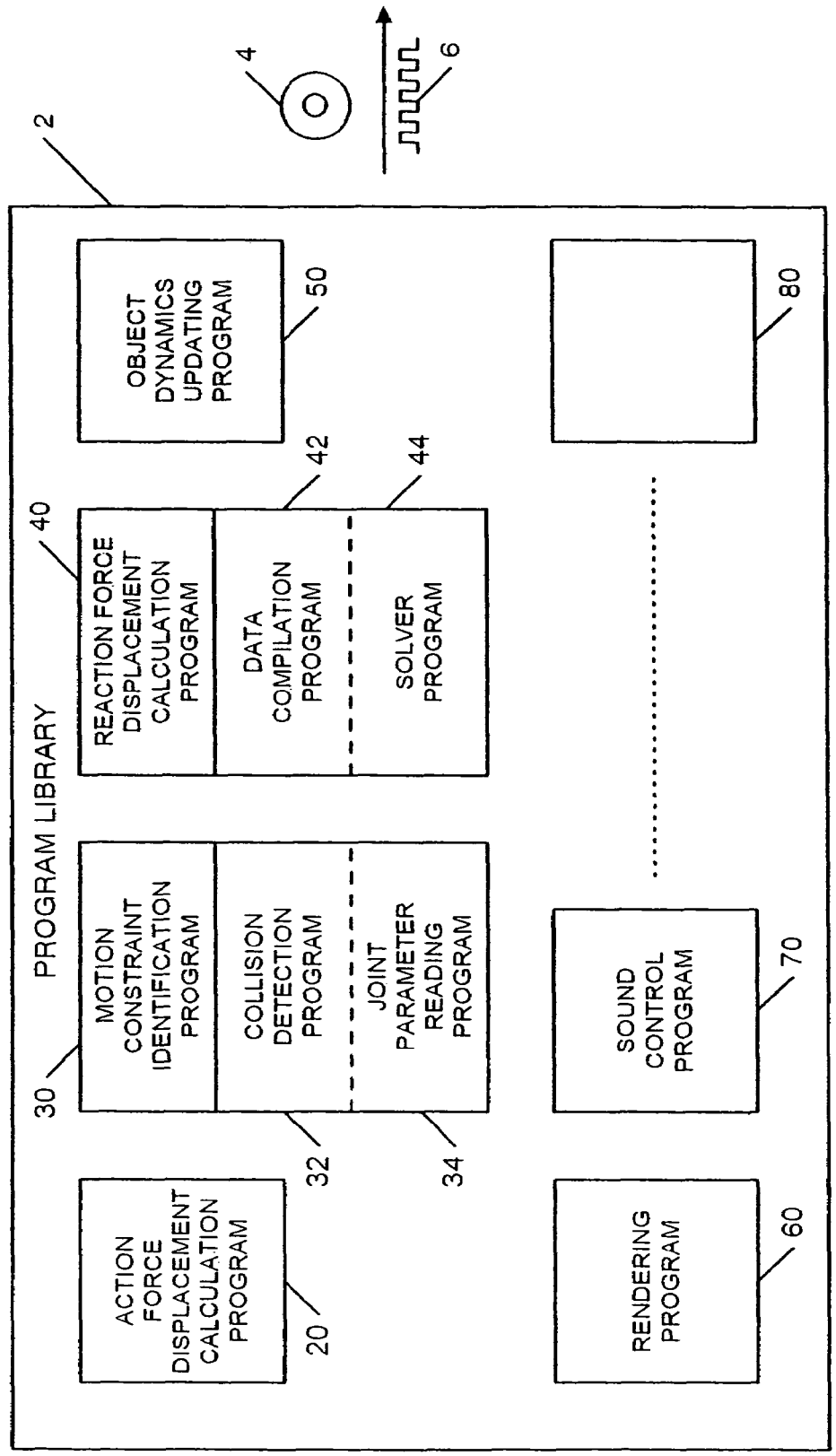
FIG. 1 schematically illustrates the contents of a software development tool kit in an embodiment.

In embodiments of a simulator according to the present invention, constraint-based simulation of the interaction of rigid bodies is done where constraints are defined in terms of the displacements of the positions of the rigid bodies and displacements caused by constraint reaction forces when the bodies interact are calculated to ensure that the bodies comply with the displacement constraints.

The simulator can be devised of hardware specifically suited to the tasks or software executable by a general purpose programmable device (or other programmable device, such as a microprocessing system). While steps, operations and/or functions of the simulator are often described herein with reference to mathematical calculations, it should be understood that these calculations are performed by an electronic device or system. For example, it need not be explicitly stated, but it should be apparent that apparatus described herein could be used to perform matrix operations described herein.

Thus, it should be understood to one of ordinary skill in the art that a process involving generating a matrix, solving a matrix equation, then performing an action based on the results of such solving might be performed by a processor that reads from a memory values representative of parameters used in a matrix generation process, wherein the processor has access to memory locations for storing the matrix values and that processor (or another processor and/or circuit) has access to those memory locations and is configured to manipulate those values in memory to arrive at a solution to the matrix equation, represented as values stored in possibly other memory locations, then executes instructions to perform the steps based on the results.

In a very specific implementation, the process is implemented by a processor and instructions in an instruction code memory wherein the process reads parameters of rigid bodies once per frame period, performs operations to determine new positions for some or all of the rigid bodies, outputs an indication of the new positions (such as outputting to a rendering engine), and so on. It should also be understood that inventions described herein might be implemented entirely in software stored on a computer-readable medium, wherein such software is executable by a processor to perform the functionality contained within that software.

Example Evaluator

In an example evaluator of a simulator according to aspects of the present invention, the evaluator constructs and evaluates Equation (5) twice, once to account for collisions between the rigid bodies and once to account for joint constraints of joints connecting the rigid bodies. Of course, the invention is not limited to exactly two evaluations of Equation (5).

$$JM^{-1}J^T \underline{\lambda} \Delta t^2 \geq \underline{B} \quad (5)$$

In Equation (5), J, $M^{-1}$, $J^T$ and $\underline{\lambda}$ have the same definition as in Equation (1) above, $\Delta t$ is the time step (that is, the time period between the times at which successive evaluations of the equation are performed in the embodiment) and $\underline{B}$ is a vector of constraints on the displacements of the rigid bodies in constraint space, with the format of $\underline{B}$ being different for the case of collision constraints acting on the rigid bodies and the case of joint constraints acting on the rigid bodies, as described in further detail below.

More particularly, the matrix $M^{-1}$ in Equation (5) is the inverse mass matrix, and in a preferred embodiment can have the same form for both the case of collisions and the case of joints. This matrix has a block diagonal form as shown in Equation (6) below, in which each matrix block is the individual inverse mass matrix of dimension 6 by 6 of a respective rigid body, with the final dimension of the matrix $M^{-1}$ being 6n by 6n with "n" being the number of rigid bodies in the system.

$$\begin{bmatrix} [M_1] & 0 & 0 & 0 \\ 0 & [M_2] & 0 & 0 \\ 0 & 0 & \ldots & 0 \\ 0 & 0 & 0 & [M_n] \end{bmatrix} \text{ with } M_n = \begin{bmatrix} \frac{1}{m_n} I_{3\times 3} & 0_{3\times 3} \\ 0_{3\times 3} & I_n^{-1} \end{bmatrix} \quad (6)$$

In Equation (6):

$m_n$ is the mass of individual rigid body n $I_{3\times 3}$ is the 3 by 3 identity matrix $0_{3\times 3}$ is the 3 by 3 null matrix $I_n^{-1}$ is the inverse inertia tensor for rigid body n In the case of Equation (5) for collisions, the Jacobian matrix J comprises a matrix having a number of columns equal to the number of rigid bodies in the system and a number of rows equal to the number of contacts between the rigid bodies. Each row of J represents one contact and has a maximum of two non-zero block matrices on the row (there being only one block matrix for a contact between a rigid body and an immovable rigid body, and there being two non-zero block matrices for a contact between two movable rigid bodies). More particularly, the non-zero block matrices on each row, $J_m$, of the Jacobian matrix J are given by:

$$J_m = C^T \cdot [[I_{3\times 3}[r_a^s]^T]/[-I_{3\times 3} - [r_b^s]^T]] \tag{7}$$

where:
C is the contact constraint frame coordinate system
$I_{3\times 3}$ is the 3 by 3 identity matrix
$r_a$ is the vector between the centre of mass of body a and the contact point, as illustrated in FIG. 10 and $r_a^s$ is the skew symmetric matrix containing the components ($r_x$, $r_y$, $r_z$) of $r_a$ as follows:

$$[r_a^s] = \begin{bmatrix} 0 & -r_z & r_y \\ r_z & 0 & -r_x \\ -r_y & r_x & 0 \end{bmatrix}$$

Figure 10:
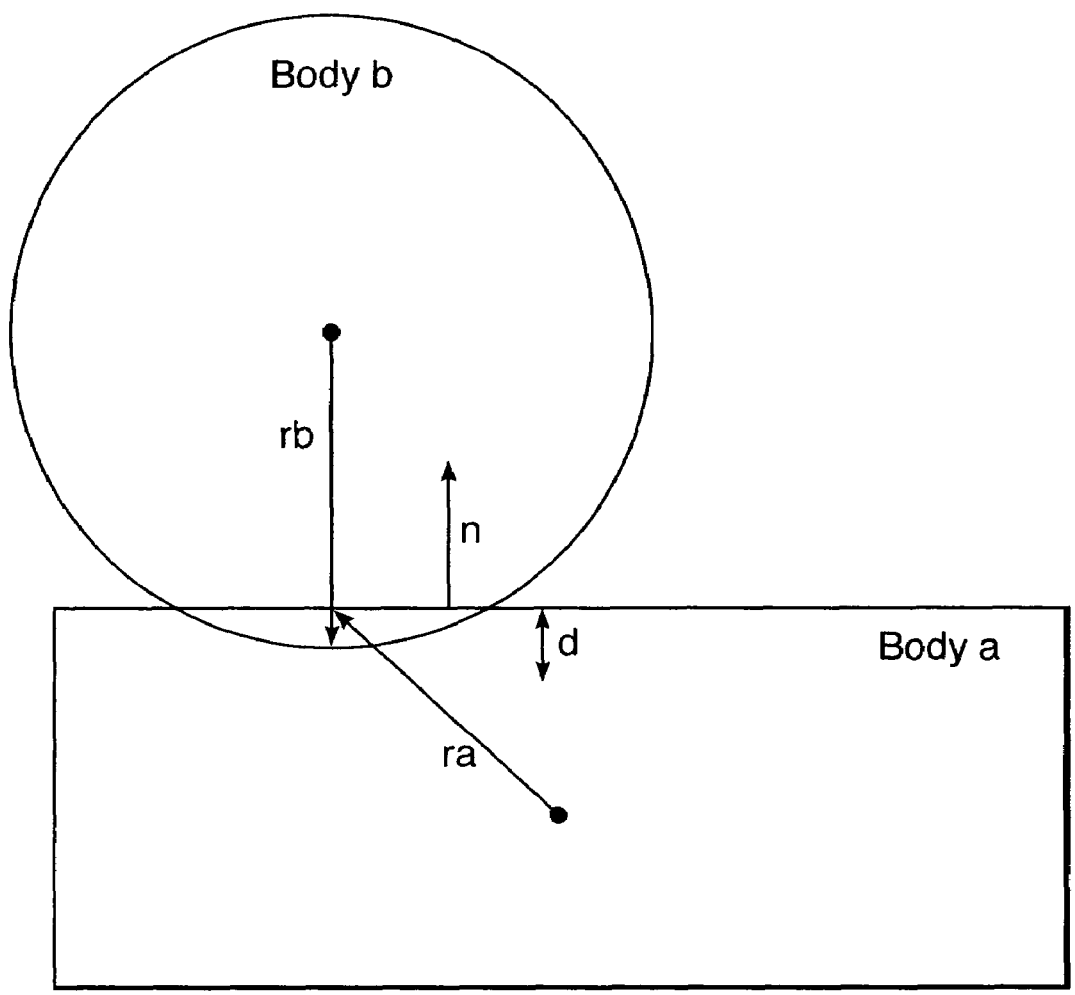
FIG. 10 shows an example to illustrate a collision between two bodies.

$r_b$ is the vector between the centre of mass of body b and the contact point, as illustrated in FIG. 10 and $r_b^s$ is the skew symmetric matrix containing the components ($r_x$, $r_y$, $r_z$) of $r_b$.

In the case of joints, the Jacobian matrix J is also a sparse matrix with the two non-zero block matrices on each row of J being given by:

$$J_m = \left[ \begin{bmatrix} L^T & L^T[r_a^s]^T \\ O_{3\times 3} & T^T \end{bmatrix} \begin{bmatrix} -L^T & -L^T[r_b^s]^T \\ O_{3\times 3} & -T^T \end{bmatrix} \right] \tag{8}$$

where:
L is the joint linear constraint frame coordinate system
T is the joint angular constraint frame coordinate system
$r_a$ is the vector between the centre of mass of body a and the joint position, as illustrated in FIG. 11 and $r_a^s$ is the skew symmetric matrix containing the components ($r_x$, $r_y$, $r_z$) of $r_a$
$r_b$ is the distance between the centre of mass of body b and the joint position, as illustrated in FIG. 11 and $r_b^s$ is the skew symmetric matrix containing the components ($r_x$, $r_y$, $r_z$) of $r_b$ When evaluating Equation (5) above for contacts between bodies, one optimization is such that the constraint reaction forces in the direction normal to the contact plane have the lowest magnitude that prevents the bodies from penetrating and another optimization is such that the constraint reaction forces in tangential directions to the contact plane have the highest magnitude that removes as much velocity through friction as is allowed by the material properties of the bodies. Material properties of the bodies might be represented as parameters to an evaluation process and as such might be stored in a memory having other parameters relating to the rigid bodies, such as their shape, mass, center of mass, surface outline, etc.

The evaluator evaluates Equation (5) to calculate a linear displacement, $D_{reaction}$, resulting from the application of constraint reaction forces during the time step $\Delta t$, and an angular displacement, $A_{reaction}$, resulting from the constraint reaction forces applied during the time step $\Delta t$, as follows:

$$\begin{bmatrix} D_{reaction} \\ A_{reaction} \end{bmatrix} = (M^{-1}J^T\lambda)\Delta t^2 \tag{9}$$

Using the calculated displacements $$\begin{bmatrix} D_{reaction} \\ A_{reaction} \end{bmatrix}$$

resulting from the constraint reaction forces, the evaluator then updates the linear and angular displacement of each body and the linear and angular position of each body using Equations (10)-(13), where $d^i$, $\omega^i$, $x^i$ and $q^i$ are the linear displacement, angular displacement, position, and orientation quaternion, respectively, of a body at time i. The values of i for which these equations might be evaluated might be the times corresponding to successive video frames, or other suitable intervals.

$$d^{t+1} = d^t + D_{action} + D_{reaction} \tag{10}$$

$$\omega^{t+1} = \omega^t + A_{action} + A_{reaction} \tag{11}$$

$$x^{t+1} = x^t + d^{t+1} \tag{12}$$

$$q^{t+1} = q^t + \frac{\omega^{t+1} \otimes q^t}{2} \tag{13}$$

Details of the constraints on the displacements of the rigid bodies used in this example (that is, the vector $\underline{B}$ in Equation (5) above) will now be described.

The constraints for the case of collisions between rigid bodies will be described first. In this case, two $\underline{B}$ vectors, $\underline{B1}$ and $\underline{B2}$, are used to define constraints on the displacements of the rigid bodies, resulting in two instances of Equation (5) to be solved as set out in equations (14) and (15) below. In both cases, the positioning constraints used derive from the general requirement that $\underline{n}(P_b - P_a) \geq 0$ to prevent the bodies penetrating.

$$JM^{-1}J^T\underline{\lambda}'_n \geq \underline{B1} = C^T\underline{n}.\Delta P \tag{14}$$

where:
$\underline{n}.\Delta P$ is a vector in which each component defines the distance between a respective pair of rigid bodies (that is, the distance between the contact points of the bodies) in a direction normal to the surface of contact between the bodies calculated on the previous iteration (and therefore represents the distance between the bodies in this direction at the end of the previous time step, which is equivalent to the distance between the bodies at the start of the current time step for the current iteration)

$$M^{-1}J^T\lambda'_n = \begin{bmatrix} D'_{reaction} \\ A'_{reaction} \end{bmatrix}$$

is the linear and angular displacement in the direction normal (perpendicular) to the contact plane caused by constraint reaction forces that removes the distances between the bodies defined by B1 (that is, the distance between the bodies at the start of the iteration).

$$JM^{-1}J^T\underline{\lambda} \geq \underline{B2} = \begin{pmatrix} \underline{n} \\ \underline{u} \\ \underline{v} \end{pmatrix} \{[P_a^n - P_b^n] + [(V_a^n + \omega_a^n \times r_a^n) - \qquad (15)$$
$$(V_b^n + \omega_b^n \times r_b^n)]\Delta t + [(F_a^n + \tau_a^n \times r_a^n) -$$
$$(F_b^n + \tau_b^n \times r_b^n)]\Delta t^2\} + \varepsilon(\Delta v \cdot \underline{n})\Delta t$$

which is equivalent to:

$$JM^{-1}J^T\underline{\lambda} \geq B2 = \begin{pmatrix} \underline{n} \\ \underline{u} \\ \underline{v} \end{pmatrix} [\Delta P + \Delta V \Delta t + \Delta F \Delta t^2] + \varepsilon(\Delta v \cdot \underline{n})\Delta t \qquad (16)$$

where:

$\begin{pmatrix} \underline{n} \\ \underline{u} \\ \underline{v} \end{pmatrix}$ are the axes of the contact frame $C$ $P^n$ is the contact point of the body at time n
$V^n$ is the linear velocity of the body at time n
$\omega^n$ is the angular velocity of the body at time n
$r^n$ is the distance between the centre of mass of the body and its contact point at time n
$F^n$ is the action force acting on the body at time n
$\tau^n$ is the action torque acting on the body at time n
$\varepsilon$ is the coefficient of restitution $0 \leq \varepsilon \leq 1$
$\Delta P = (P_a^n - P_b^n)$ is the distance between the contact points of body a and body b at time $t=n$
$\Delta V \Delta t = [(V_a^n + \omega_a^n \times r_a^n) - (V_b^n + \omega_b^n \times r_b^n)]\Delta t$ is the displacement resulting form the relative velocity of bodies a and b during the time interval $\Delta t$
$\Delta F \Delta t^2 = [(F_a^n + \tau_a^n \times r_a^n) - (F_b^n + \tau_b^n \times r_b^n)]\Delta t^2$ is the displacement resulting form the relative action forces (that is gravity, propulsion forces etc.) acting on bodies a and b during the time interval $\Delta t$ It will be understood from the above, therefore, that Equation (15) can be decomposed as follows:

$$JM^{-1}J^T\lambda_n = \underline{n} \cdot (\Delta P + \Delta F \Delta t^2 + (1+\varepsilon)\Delta V \Delta t) \qquad (17)$$

$$JM^{-1}J^T\lambda_u = \underline{u} \cdot (\Delta P + \Delta F \Delta t^2 + \Delta V \Delta t) \qquad (18)$$

$$JM^{-1}J^T\lambda_v = \underline{v} \cdot (\Delta P + \Delta F \Delta t^2 + \Delta V \Delta t) \qquad (19)$$

Equation (14) is evaluated to determine the displacements between the bodies in the normal direction at the start of the current iteration. The $\Delta P$ displacements in Equation (15) are then updated to remove this normal direction displacement before Equation (15) is evaluated itself to calculate the displacements of the bodies in the normal and tangential directions at the end of the current iteration. As a result, the equation $JM^{-1}J^T\underline{\lambda} \geq \underline{B2} - \underline{B1}$ is evaluated (with B1 equal to $JM^{-1}J^T \lambda_n'$).

The position constraints B1 and B2 have been described above for the case of collisions between the rigid bodies. Similar position constraints can be defined for the case of joints between rigid bodies.

By defining constraints in terms of positions of the rigid bodies and calculating constraint reaction forces necessary to ensure that the dynamics of the rigid bodies comply with the position constraints, the simulator provides a number of advantages compared to systems in which velocity-based constraints are employed.

In particular, any error between the positions of the bodies is corrected without imparting additional velocity or acceleration to the bodies. As a result, the system simulates the positions of the bodies with better accuracy and more stability (this being particularly true in the case of stacks of three or more bodies resting upon each other without movement).

The use of Equation (14) to remove the difference in position between bodies in the normal direction at the start (not the end) of the current time step assists in achieving this increased accuracy and stability.

Details of the processing components and processing operations in an embodiment to set up and evaluate the equations above will now be described.

In the example embodiment described below, a development toolkit comprising a library of respective software computer programs is supplied to a game development apparatus (comprising one or more processing apparatus operated by one or more users). The supplied programs from the library are then used in the game development apparatus to generate compiled software defining a three-dimensional (3D) computer graphics application (a computer game in this embodiment, but other applications are also possible).

The compiled game code is then supplied to a game platform, which executes the compiled game code. In some embodiments, the game code is represented entirely in software on computer-readable medium. In other embodiments, the game code is represented in part in firmware, hardware and/or the like. Processes of simulation of rigid body dynamics are described in this context. However, other embodiments are, of course, possible.

Figure 2:
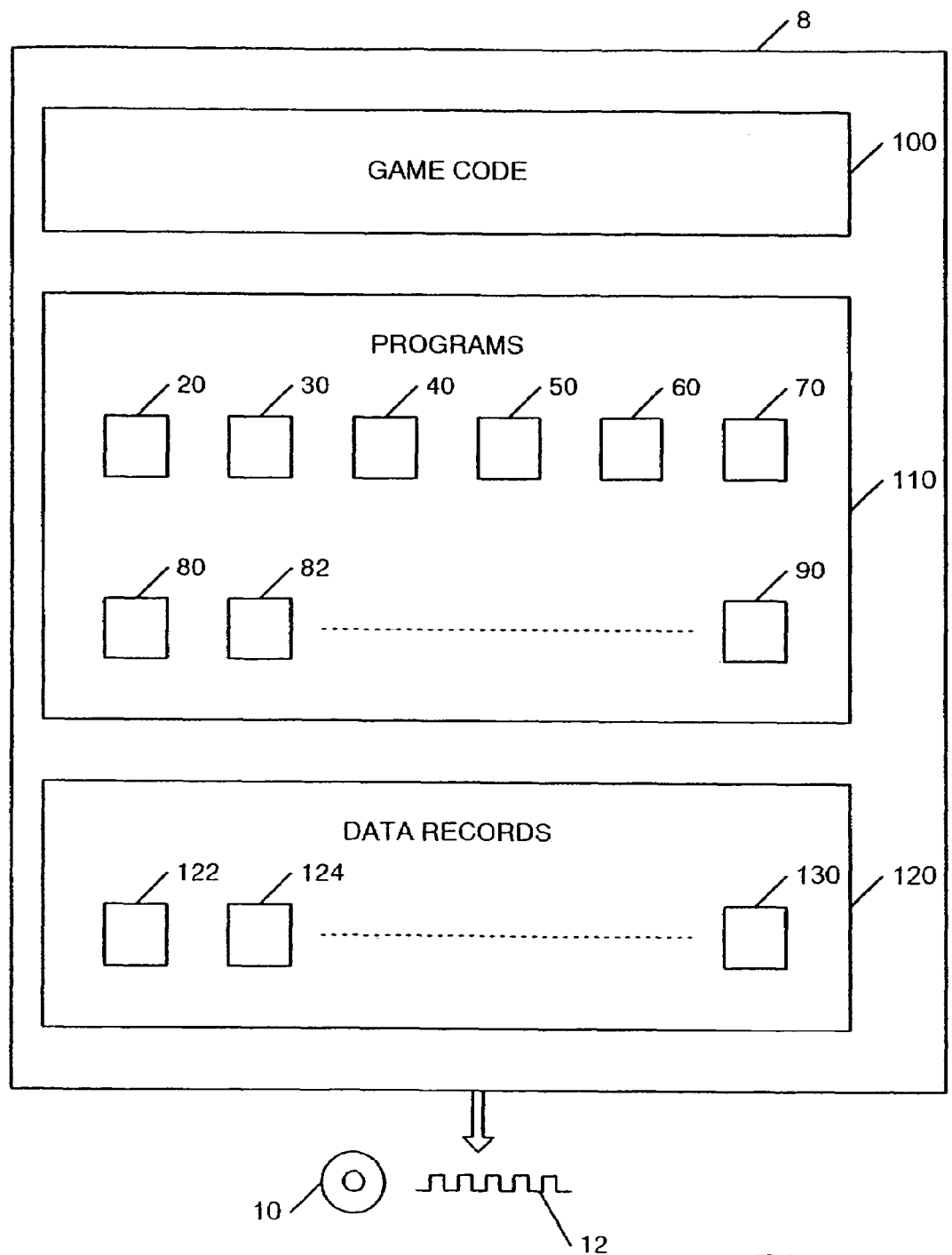
FIG. 2 schematically illustrates the contents of an application product in an embodiment.
Figure 3:
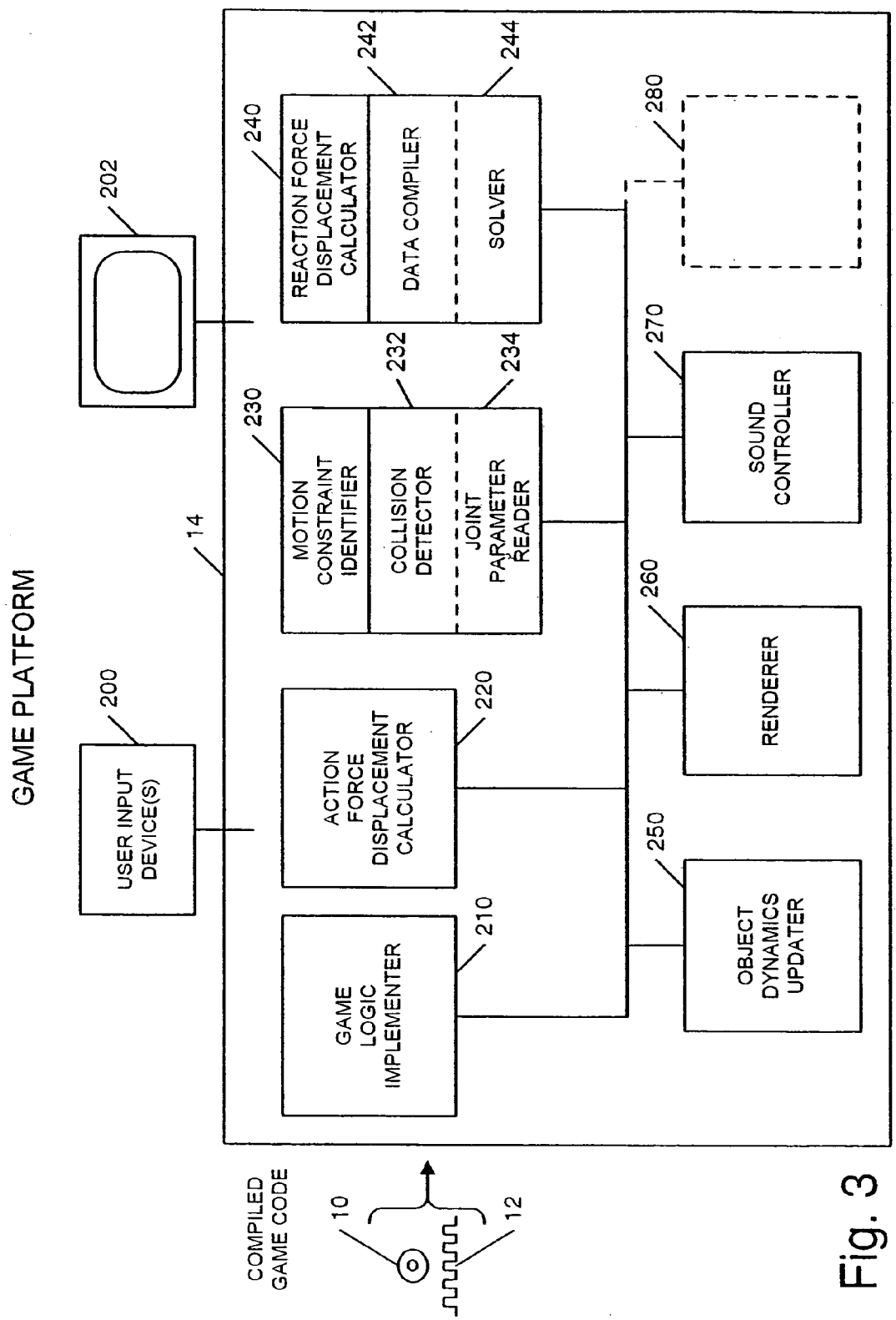
FIG. 3 schematically illustrates a programmable game platform, and also shows some of the notional functional processing units and data stores into which the programmable game platform may be thought of as being configured in an embodiment when programmed by the programming instructions of the application product shown in FIG. 2.

Referring to FIGS. 1, 2 and 3, an overview of the generation and use of a 3D computer graphics game will be described first.

A software development toolkit comprising a program library 2 is supplied as code (either source code or compiled code) carried by a storage medium 4 (such as an optical CD ROM, semiconductor ROM, magnetic recording medium, etc.) or by a signal 6 (for example, an electrical or optical signal transmitted over a communication network such as the Internet or through the atmosphere) to a game developer apparatus (not shown). The game developer apparatus is operated to use the programs contained in the program library 2 to generate software code defining an application product 8, which, in this embodiment, comprises a computer game which uses 3D computer graphics to interactively display images to a user.

The code 8 defining the 3D computer graphics game is supplied as compiled code on a storage medium 10 (such as an optical CD ROM, semiconductor ROM, magnetic recording medium, etc.) or as compiled code carried by a signal 12 (for example an electrical or optical signal transmitted over a communication network such as the Internet or through the atmosphere) to a game platform 14. The software defining the 3D computer graphics game 8 may then be installed in, and run by, the game platform 14.

Referring again to FIG. 1, the program library 2 of the software development toolkit comprises software code defining a plurality of programs 20-80, each for causing a target type of programmable processing apparatus (that is, a game developer apparatus or game platform 14 in this embodiment) to perform particular 3D computer graphics processing operations. The programs 20-80 in this software development toolkit 2 are generated by one or more users writing program code, with the programs then being collected together to generate the program library 2.

In this embodiment, the programs in the program library 2 include action force displacement calculation program 20, motion constraint identification program 30, reaction force displacement calculation program 40, object dynamics updating program 50, rendering program 60, sound-control program 70, and other 3D computer graphics programs (schematically represented by the dots in block 80 in FIG. 1) such as lighting programs, virtual viewing camera control programs, etc.

Action force displacement calculation program 20 comprises code for calculating the linear displacement caused by reaction forces acting on the rigid bodies during a given time step (that is, $D_{action}$ in Equation (10)) and the angular displacement caused by the action forces acting on the rigid bodies during the time step that is, $A_{action}$ in Equation (11)). As explained above, the action forces comprise all forces acting on the bodies which do not result from a constraint on the bodies' movements (such as a collision or joint). The action forces therefore include forces such as gravity, propulsion forces resulting from simulation of a motor, etc., and other similar forces.

Motion constraint identification program 30 comprises code to identify constraints applying forces during a time step which constrain the dynamics of the rigid bodies during that time step.

In this embodiment, motion constraint identification program 30 comprises a collision detection program 32 and a joint parameter reading program 34.

Collision detection program 32 comprises code to detect collisions occurring between bodies in a given time step. In this embodiment, collision detection program 32 comprises a conventional collision detection program such as available from Criterion Software Limited, Guildford, United Kingdom.

Joint parameter reading program 34 comprises code for reading the parameters of each joint connecting rigid bodies.

Reaction force displacement calculation program 40 comprises code to calculate the linear displacement caused by constraint reaction forces acting on the rigid bodies during a given time step (that is, $D_{reaction}$ in equations (9) and (10) above) and the angular displacement caused by the constraint reaction forces acting on the rigid bodies during the time step (that is, $A_{reaction}$ in equations (9) and (11) above).

In this embodiment, reaction force displacement calculation program 40 comprises data compilation program 42 and solver program 44.

Data compilation program 42 comprises code to compile data defining the known variables in equations (14) and (15) above (and similar equations for joints).

Solver program 44 comprises code for solving equations (14) and (15) above (and similar equations for joints) to calculate $D_{reaction}$ and $A_{reaction}$ using an iterative solving process, as described in detail later.

Object dynamics updating program 50 comprises code for updating the linear and angular displacement (implicitly defining the linear and angular velocity) and the linear and angular position of each rigid body using equations (10) to (13) above using the values of $D_{action}$, $D_{reaction}$, $A_{action}$ and $A_{reaction}$ calculated by the action force displacement calculation program 20 and the reaction force displacement calculation program 40.

Rendering program 60 comprises code to render images of the three-dimensional bodies to generate image data for display. In this embodiment, rendering program 60 comprises a conventional rendering program such as RenderWare™ available from Criterion Software Limited, Guildford, United Kingdom.

Sound control program 70 comprises code to generate sound data for output to a user.

As described previously, the programs 20-80 in program library 2 are input to a game developer apparatus (not shown). The user(s) of the game developer apparatus then generates software code defining application product 8 (which, in this embodiment, comprises a computer game which uses 3D computer graphics to interactively display images to a user).

Referring to FIG. 2, the application product 8 contains game code 100, a library of programs 110 and a library of data records 120.

The game code 100 comprises software instructions written by the user(s) of the game developer apparatus defining instructions for controlling game platform 14 to play the computer game in accordance with user inputs. The game code 100 includes calls to programs in the program library 110.

The programs in the program library 110 include all of the programs 20-90 from the software development toolkit 2, together with additional programs generated by the user(s) of the game development apparatus.

The data record library 120 includes, in a conventional manner for 3D computer graphics games, data defining polygon models representing 3D bodies and scenes, data defining properties of materials associated with the polygons, data defining cameras to view the 3D computer models and scenes, and data defining light sources to light the 3D computer models and scenes, etc.

The compiled machine code defining application product 8 is delivered to end users of game platforms 14 as code on a storage medium 10, and/or as a signal 12, as described above. The code defining application product data may be output from the game developer apparatus and stored directly on storage medium 10. Alternatively, the code defining application product 8 output from the game developer apparatus may be stored on a "master" storage medium and then further storage media 10 storing the code may be generated therefrom for delivery to the user of a game platform 14. In this way, an indirect recording is made of the code defining application product 8 from the game developer apparatus for delivery to a user of a game platform 14. Similarly, the signal 12 carrying the code defining application product 8 to game platform 14 may be the direct output of the game developer apparatus or a signal generated indirectly therefrom.

Referring to FIG. 3, game platform 14 comprises, in a conventional manner, one or more processors, memories, graphics cards, sound cards, together with prestored programming instructions for the control of the processors, etc. Game platform 14 is connected to one or more user-input devices 200 for inputting user instructions to play the game (such as a control pad, joystick, keyboard, etc.) and a display device 202, which may be of any known form.

Game platform 14 is programmed to operate in accordance with the game code input from storage medium 10 and/or signal 12.

When programmed by the programming instructions of the application product 8, game platform 14 can be thought of as being configured as a number of functional processing units and data stores. Examples of relevant functional processing units and data stores are schematically illustrated in FIG. 3. The processing units, data stores and interconnections illustrated in FIG. 3 are, however, notional and are shown for illustration purposes only to assist understanding; they do not necessarily represent the actual processing units, data stores and interconnections into which the processors, memories, etc. of the game platform 14 become configured.

Referring to FIG. 3, when programmed by the game code, game platform 14 may be thought of as including a game logic implementer 210, an action force displacement calculator 220, a motion constraint identifier 230, a reaction force displacement calculator 240, an object dynamics updater 250, a renderer 260, a sound controller 270 and other functional processing units (schematically illustrated by the dotted lines and block 280 in FIG. 3).

Game logic implementer 210 comprises one or more processors operating in accordance with programming instructions from the game code 100 of application product 8.

Action force displacement calculator 220 comprises one or more processors operating in accordance with the action force displacement calculation program 20 from the program library 110 of application product 8.

Motion constraint identifier 230 comprises one or more processors operating in accordance with the motion constraint program 30 from the program library 110 of application product 8.

Reaction force displacement calculator 240 comprises one or more processors operating in accordance with the reaction force displacement calculation program 40 from the program library 110 of application product 8.

Object dynamics updater 250 comprises one or more processors operating in accordance with the object dynamics updating program 50 from the program library 110 of application product 8.

Renderer 260 comprises one or more processors operating in accordance with the rendering program 60 from the program library 110 of application product 8.

Sound controller 270 comprises one or more processors operating in accordance with the sound control program 70 from the program library 110 of application product 8.

Figure 4B:
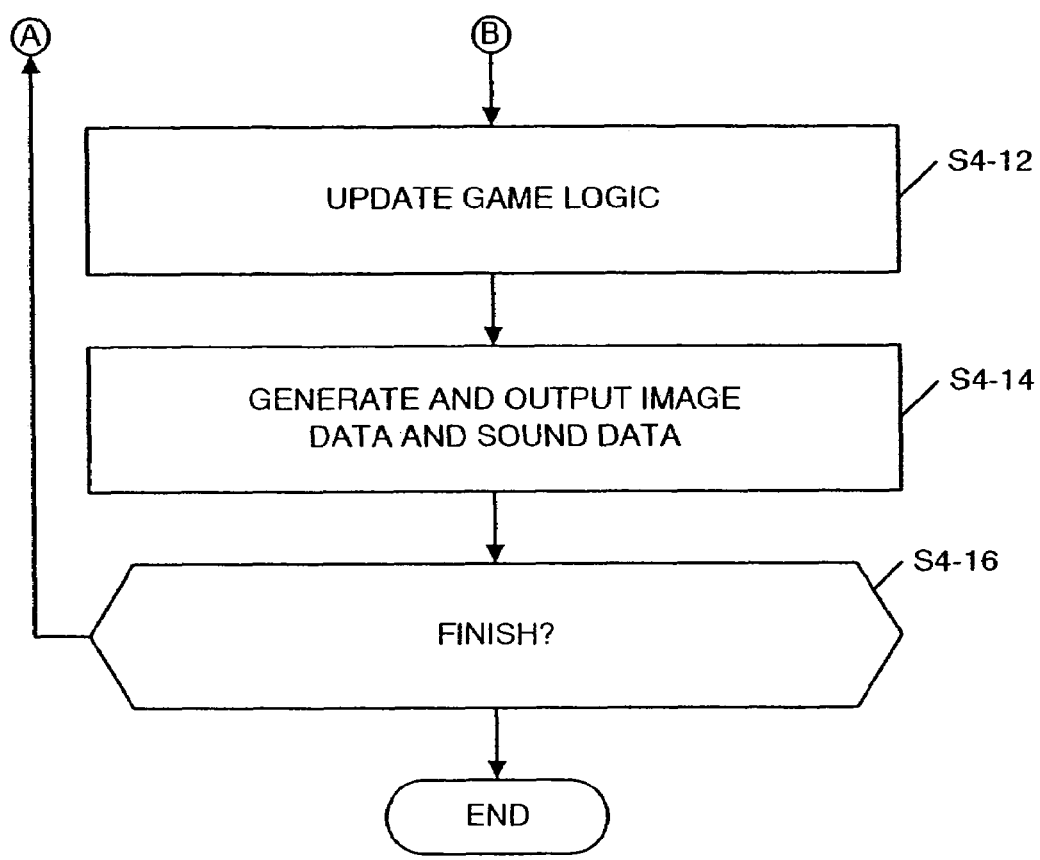

Referring now to FIGS. 4a and 4b, the processing operations performed by the functional processing units in the game platform 14 when the compiled game code 8 supplied to the platform is run will now be described.

Referring to FIG. 4a, the processing operations at steps S4-2 to S4-16 are continually repeated as the game proceeds to generate and display images interactively to the user in accordance with the game rules. Images are generated and displayed on display device 202 at discrete time intervals which, in this embodiment, comprise every 1/60th of a second. Other frame intervals are possible and might or might not coincide with a display refresh rate.

At step S4-2, game logic implementer 210 reads instructions input by the user using a user-input device 200, and also reads the game logic (defining, inter alia, the rules of the game) and the parameters of the 3D objects currently active in the game. The object parameters define, inter alia, the action forces acting on the objects (that is, gravity, propulsion forces and similar forces), the current position of each object in 3D world space, and the current velocity of each object in 3D world space.

At step S4-4, action force displacement calculator 220 calculates the linear and angular displacements in 3D world space, caused by the action forces acting on the bodies read at step S4-2. In this embodiment, action force displacement calculator 220 calculates the linear displacement, $D_{action}$ and the angular displacement $A_{action}$, using the following equations:

$$D_{action} = \frac{\Delta t^2 \cdot F_{action}}{m} \quad (20)$$

$$A_{action} = \frac{\Delta t^2 \cdot \tau_{action}}{m} \quad (21)$$

where:

$F_{action}$ is the total of all action forces acting on the body $\tau_{action}$ is the total of all action torques acting on the body.

At step S4-6, motion constraint identifier 230 performs processing to identify motion constraints acting upon the objects.

Figure 5:
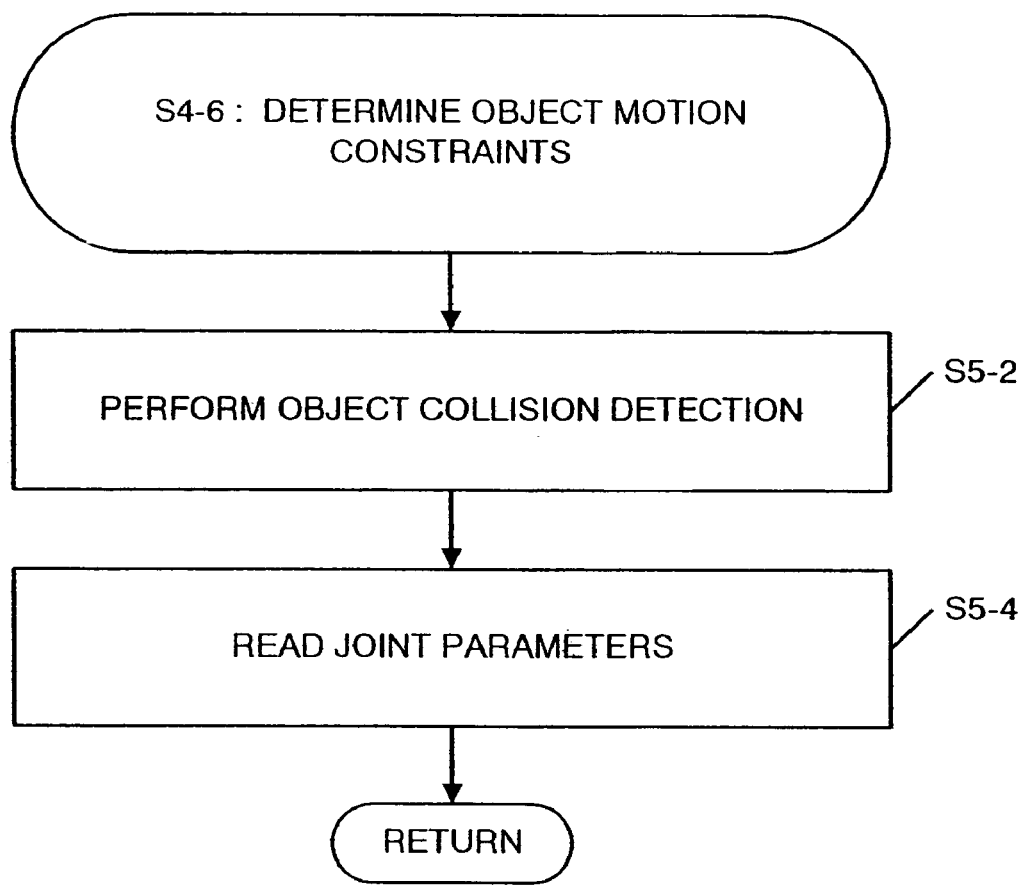
FIG. 5 shows the processing operations performed at step S4-6 in FIG. 4.

FIG. 5 shows the processing operations performed by motion constraint identifier 230 at step S4-6 in this embodiment.

Referring to FIG. 5, at step S5-2, collision detector 232 performs object collision detection for the current time step using the object parameters read at step S4-2. In this embodiment, this processing is performed in a conventional manner and generates data for each contact between each pair of objects comprising (as illustrated in FIG. 10) the identities of the two bodies, the vector $\underline{r}_a$ between the point of contact and the centre of mass of body a, the vector $\underline{r}_b$ between the point of contact and the centre of mass of body b, the normal vector $\underline{n}$ for the contact defining a direction perpendicular to the plane of contact, and the distance between the bodies in the normal direction.

At step S5-4, joint parameter reader 234 reads the parameters of each joint connecting the objects. Referring to FIG. 11, the parameters read at step S5-4 define the coordinate frame for body a with angular limits, the coordinate frame for body b with angular limits, the coordinate frame for the joint with prismatic limits, the vector $\underline{r}_a$ between the centre of mass of body a and the position of the joint, and the vector $\underline{r}_b$ between the centre of mass of body b and the joint position. The example shown in FIG. 11 is a ball and socket joint. Corresponding parameters are read for other types of joints.

Referring again to FIG. 4, at step S4-8, reaction force displacement calculator 240 calculates the linear and angular displacement, $D_{reaction}$ and $A_{reaction}$, for each object in 3D world space caused by the motion constraints identified at step S4-6.

Equation (9) above defines the equation to be solved in order to calculate the linear and angular displacements $D_{reaction}$, $A_{reaction}$ of the rigid bodies caused by the constraint reaction forces. To evaluate this equation directly, however, it would be necessary to calculate $J^T$ which would be computationally expensive, require large memory resources and require a large number of memory access operations due to the large size of the J matrix. The present embodiment therefore employs a technique which avoids calculating $J^T$ and which is ideally suited to game platforms which do not have significant processing resources or memory. However, it is not required that the simulator not perform this calculation if it is able to.

More particularly, Equation (9) is decomposed into a system of linear algebraic equations as follows:

$$J \begin{bmatrix} D^{reaction} \\ A^{reaction} \end{bmatrix} \geq B \qquad (22)$$

$$\begin{bmatrix} D^{reaction} \\ A^{reaction} \end{bmatrix} = M^{-1} J^T \lambda \qquad (23)$$

where:

$$\begin{bmatrix} D^{reaction} \\ A^{reaction} \end{bmatrix}$$

is a column vector containing the displacements of all bodies.

As will be explained in detail below, the present embodiment solves equations (22) and (23) iteratively. For a single contact between two bodies, values of $D_{reaction}$ and $A_{reaction}$ are estimated and used to calculate values of $\lambda$ (which defines the impulse of the constraint reaction forces in this embodiment). The calculated values of $\lambda$ are then used to update the values of $D_{reaction}$ and $A_{reaction}$, for the single contact. By evaluating the equations for a single contact only the transpose of the blocks of J for that contact need to be calculated and not the transpose of J as a whole. The values of $D_{reaction}$ and $A_{reaction}$ are then used as initial values for the processing of the next contact, in which values of $\lambda$ are calculated and the values of $D_{reaction}$ and $A_{reaction}$ are refined in the same way as the processing for the first contact. This processing is repeated for all contacts and then all joints, with further iterations of the whole processing then being performed.

Figure 6:
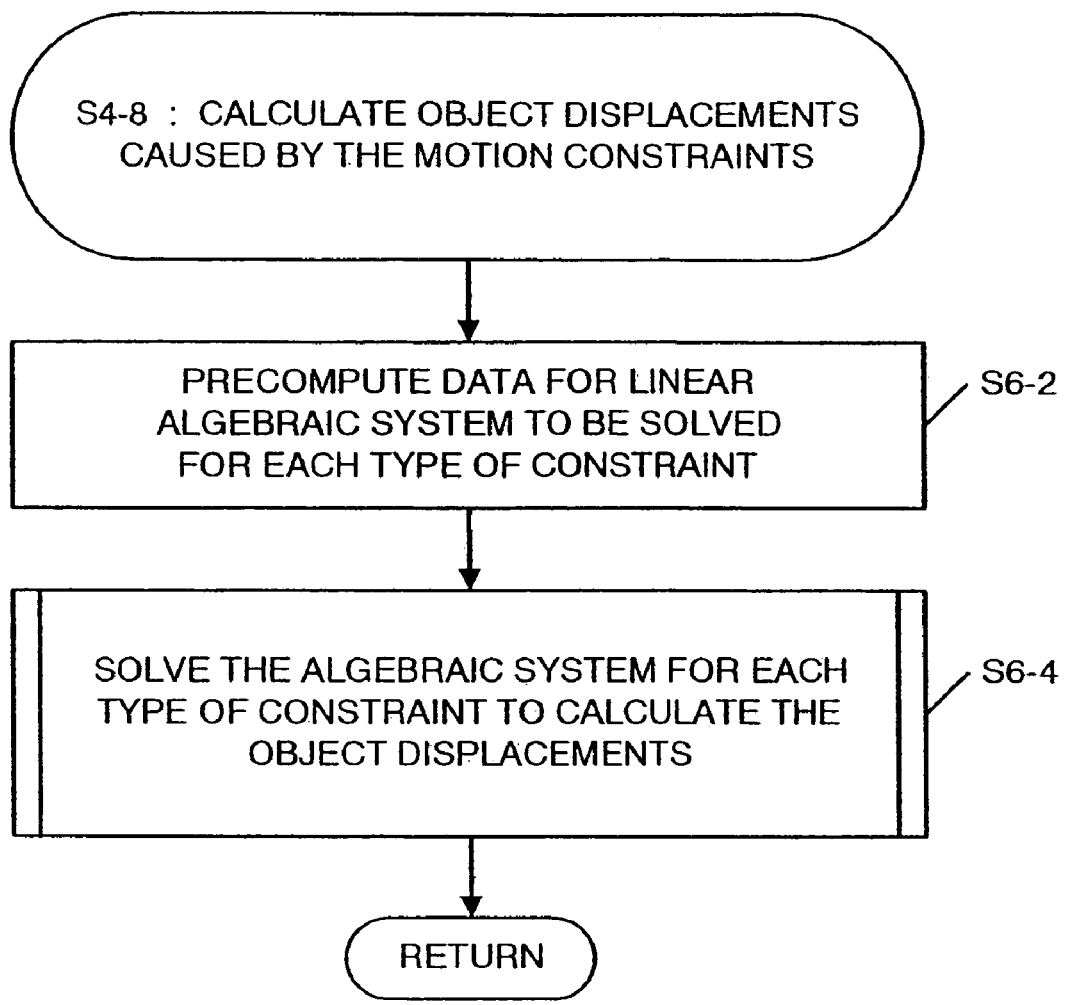
FIG. 6 shows the processing operations performed at step S4-8 in FIG. 4.

FIG. 6 shows the processing operations performed by reaction force displacement calculator 240 at step S4-8 in this embodiment.

Referring to FIG. 6, at step S6-2, data compiler 242 generates data defining the known values in the linear algebraic system to be solved for each of the constraints identified at step S4-6.

More particularly, data compiler 242 generates data defining the known variables in equations (14) and (15) above for collisions and Equation (9) above for joints. The data is stored in native format which provides the advantages that the format can be efficiently processed using vector arithmetic by the game platform 14 as well as reducing the amount of storage needed in game platform 14. The data is of fixed size corresponding to a fixed amount of arithmetic operations required to evaluate the equations. As a result, the amount of memory required to store the data, the number of memory accesses and the amount of time required to process the data are independent of the complexity of the problem. In the case of a collision, the data generated at step S6-2 in this embodiment comprises:

$$\begin{matrix} B1 \\ B2 \end{matrix} \qquad (24)$$

$$J \Leftrightarrow \{C^T, -r_a^s, -r_b^s\}$$

-continued $$M^{-1} J^T \Leftrightarrow \left\{ \begin{matrix} C, \dfrac{1}{m_a}, \dfrac{1}{m_b} \\ I_a^{-1}[r_a^s]C, I_b^{-1}[r_b^s]C \end{matrix} \right\}$$

In the case of a joint, the data generated at step S6-2 comprises:

$$\begin{matrix} B_{linear} \\ B_{angular} \end{matrix} \qquad (25)$$

$$J \Leftrightarrow \left\{ \begin{matrix} L^T, -r_a^s, -r_b^s, \\ T^T \end{matrix} \right\}$$

$$M^{-1} J^T \Leftrightarrow \left\{ \begin{matrix} L, \dfrac{1}{m_a}, \dfrac{1}{m_b} \\ I_a^{-1}[r_a]L, I_b^{-1}[r_b]L, I_a^{-1}T, I_b^{-1}T \end{matrix} \right\}$$

At step S6-4, solver 244 performs processing to solve the linear algebraic system defined by equations (22) and (23) above to calculate the linear and angular displacement of each object caused by the constraint reaction forces.

Figure 7:
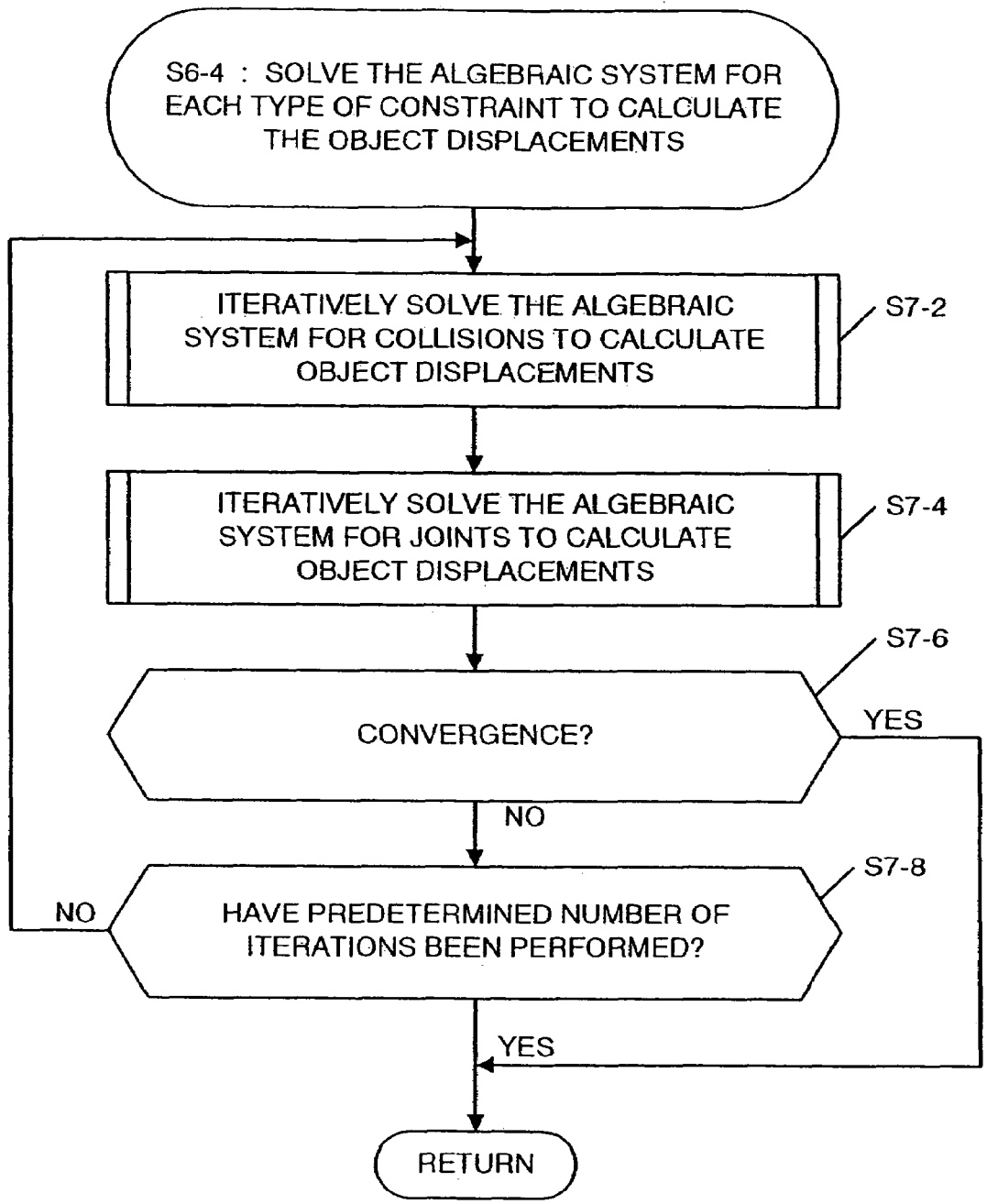
FIG. 7 shows the processing operations performed at step S6-4 in FIG. 6.

FIG. 7 shows the processing operations performed by solver 244 at step S6-4 in this embodiment.

Referring to FIG. 7, at step S7-2, solver 244 iteratively solves the collision linear algebraic system defined by equations (22) and (23) above to calculate the linear and angular displacements of the objects caused by reaction forces resulting from collisions.

The displacements calculated at step S7-2 are then used as initial displacements in processing at step S7-4, in which solver 244 iteratively solves the joint linear algebraic system defined by equations (22) and (23) above to calculate the linear and angular displacements of the objects caused by reaction forces resulting from joints.

This processing is repeated (with the linear and angular displacements calculated at step S7-4 being fed back as starting displacements for the processing at step S7-2 and the displacements calculated at step S7-2 being used as starting displacements for the processing at step S7-4) until a convergence test is satisfied or until a predetermined number of iterations have been performed, as will be described in detail later.

Figure 8:
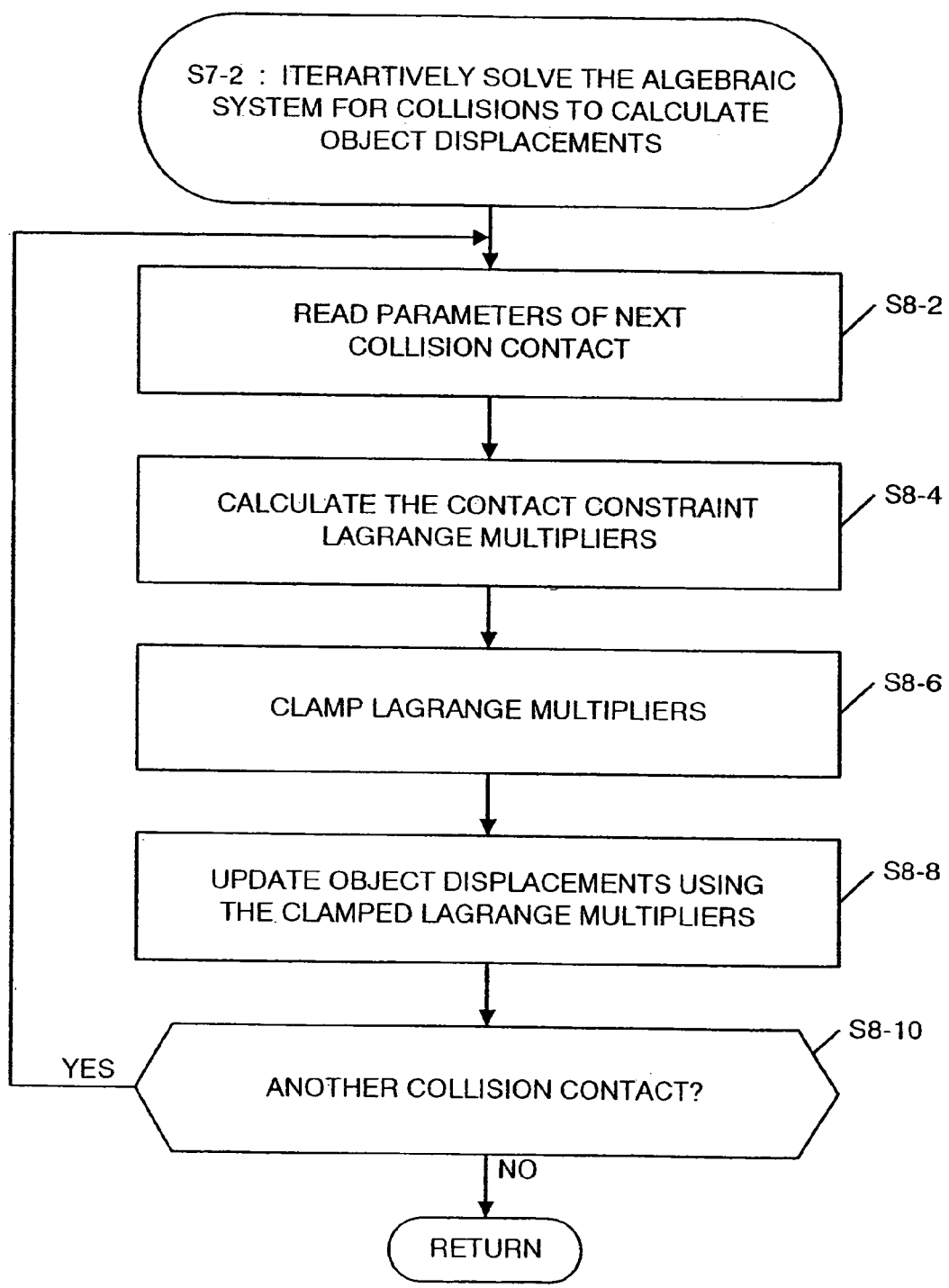
FIG. 8 shows the processing operations performed at step S7-2 in FIG. 7.

FIG. 8 shows the processing operations performed by solver 244 at step S7-2 in the present embodiment.

As explained above the processing performed at step S7-2 avoids the need for calculating the transpose of the whole Jacobian matrix J, thereby reducing the burden on processing requirements memory storage.

Referring again to equations (22) and (23), the equations are iteratively solved in this embodiment by considering each collision contact separately, and for each contact (a) estimating initial values for the components of $\lambda$ using estimates of the displacements caused by the reaction forces, $D_{reaction}$ and $A_{reaction}$; (b) ensuring that the estimated values of $\lambda$ lie within allowed bounds; (c) updating estimates of the displacements caused by the reaction forces ($D_{reaction}$ and $A_{reaction}$) using the estimated values of $\lambda$; and (d) repeating the processing in steps (a) to (c) for each collision contact using as input the values of $\lambda$, $D_{reaction}$ and $A_{reaction}$ calculated on previous iterations.

As a result, the displacements $D_{reaction}$ and $A_{reaction}$ caused by the collision reaction forces are updated differentially and fed back to update the reaction forces themselves ($\lambda$). By doing this, there is no need to calculate the transpose of the whole Jacobian matrix J, and instead it is only necessary to calculate the transpose of individual blocks on a row of J for each individual contact. The processing is therefore completely linearised; the displacements $D_{reaction}$ and $A_{reaction}$ are updated at the same time as the impulse $\lambda$ in a fixed amount of calculations, and memory storage is linearly proportional to the amount of contacts. Linear time processing is that processing which requires an effort that is linearly proportional to the number of items to be processed, or approximately so, rather than quadratically proportional or higher order proportional. Some additional overhead might be needed for increased numbers of items, but generally that would still be considered linearly proportional if the overhead does not grow too fast with the number of items. Effort required can be measured in processing steps required, memory operations or locations required, or similar measures.

Referring to FIG. 8, at step S8-2, solver 244 reads the parameters of the next collision contact generated at step S6-2 (this being the first collision contact the first time step S8-2 is performed).

At step S8-4, solver 244 calculates values for the components of the Lagrange multipliers $\lambda$ for the contact as follows (these representing the impulse of the constraint reaction forces as explained above):

$$\lambda_c^{n+1} = \lambda_c^n - \underline{n}[(D_a^{n\cdot correction} - r_a \times A_a^{n\cdot correction}) - (D_b^{n\cdot correction} - r_b \times A_b^{n\cdot correction})] + \underline{n} \cdot \Delta P \quad (26)$$

$$\lambda_n^{n+1} = \lambda_n^n - C^T[((D_a^n + D_a^{n\cdot correction}) - r_a \times (A_a^n + A_a^{n\cdot correction})) - ((D_b^n + D_b^{n\cdot correction}) - r_a \times (A_b^n + A_b^{n\cdot correction}))] + \underline{n} \cdot (\Delta P + \Delta F + (1+\varepsilon)\Delta V) \quad (27)$$

$$\lambda_u^{n+1} = \lambda_u^n - C^T[(D_a^n - r_a \times A_a^n) - (D_b^n - r_b \times A_b^n)] + \underline{u} \cdot (\Delta P + \Delta V + \Delta F) \quad (28)$$

$$\lambda_v^{n+1} = \lambda_v^n - C^T[(D_a^n - r_a \times A_a^n) - (D_b^n - r_b \times A_b^n)] + \underline{v} \cdot (\Delta P + \Delta V + \Delta F) \quad (29)$$

On the first iteration of step S8-4, the values of $D_a^{n\cdot correction}, A_a^{n\cdot correction}, D_b^{n\cdot correction}, A_b^{n\cdot correction}, D_a, A_a, D_b$ and $A_b$ are all set to zero. In addition, all components of $\lambda^n$ are set to zero. As a result, on the first iteration, the values of the components of $\lambda$ are determined solely by the components of B1 and B2 in the equations above.

It will be seen from Equation (27) above that the value of $\lambda_n$ is calculated using the displacement correction $D^{n\cdot orrection}$, $A^{n\cdot orrection}$ from the previous iteration. As explained previously, the displacement correction removes the displacement between the bodies in the direction perpendicular to the contact plane of the collision at the start of the time step without introducing any velocities to the bodies. Accordingly, this displacement is removed before $\lambda_n$ is evaluated for the current iteration.

By performing the processing at step S8-4 as described above, solver 244 calculates values for the components of $\lambda$ as a vector operation on four scalars (namely the $\underline{n}$, $\underline{u}$, and $\underline{v}$, components of $\lambda$ and also the correction component of $\lambda$). All of these values are calculated in a single vector operation considerably reducing processing time and resources. Further, solver 244 evaluates equations (26) and (27) by evaluating the 4-dimensional boundary vector equation set out below (labelled 26a, 27a). As a result, solver 244 reads the parameters from $JM^{-1}J^T$ necessary to evaluate equations (26) and (27) only once, thereby reducing the number of memory accesses and saving further processing time and resources:

$$JM^{-1}J^T \begin{bmatrix} \underline{n} \\ (JM^{-1}J^T)u \\ v \\ (JM^{-1}J^T)c \end{bmatrix} \begin{pmatrix} \lambda_n \\ \lambda_u \\ \lambda_v \\ \lambda_c \end{pmatrix} = \begin{pmatrix} C^T(\Delta P + \Delta V + \Delta P) + \varepsilon \Delta v.\underline{n} \\ \underline{n}.\Delta P \end{pmatrix} \quad \begin{pmatrix} 26a \\ 27a \end{pmatrix}$$

At step S8-6, solver 244 tests the values of the Lagrange multipliers $\lambda$ calculated at step S8-4 to determine whether they are within acceptable bounds and clamps any value which lies outside the acceptable bounds.

More particularly, in this embodiment, solver 244 performs processing in accordance with the following equations:

If $\lambda_c^{n+1} < 0$ then set $\lambda_c^{n+1} = 0$ \quad (30)

If $\lambda_n^{n+1} < 0$ then set $\lambda_n^{n+1} = 0$ \quad (31)

If $\lambda_{u,v}^{n+1} < -\mu_s \lambda_n^{n+1}$ then set $\lambda_{u,v}^{n+1} = -\mu_d \lambda_n^{n+1}$ \quad (32)

If $\lambda_{u,v}^{n+1} > \mu_s \lambda^{n+1}$ then set $\lambda_{u,v}^{n+1} = \mu_d \lambda_n^{n+1}$ \quad (33)

where:
$\mu_s$ is the Coulomb static friction coefficient
$\mu_d$ is the Coulomb dynamic friction coefficient By performing processing in accordance with equations (30) and (31), solver 244 ensures that the constraint reaction forces do not act to push the two objects together. By performing the processing in accordance with equations (32) and (33), solver 244 ensures that friction conditions are complied with.

At step S8-8, solver 244 performs processing to update the linear and angular displacements of the objects and the displacement correction terms for the objects using the values of $\lambda$ previously calculated at step S8-4. In this embodiment, solver 244 performs processing to update the values in accordance with the following equations (34)-(41).

$$D_a^{n+1} = D_a^n + C \frac{(\lambda^{n+1} - \lambda^n)}{m_a} \quad (34)$$

$$A_a^{n+1} = A_a^n + I_a^{-1}[r_a]C.(\lambda^{n+1} - \lambda^n) \quad (35)$$

$$D_b^{n+1} = D_b^n - C \frac{(\lambda^{n+1} - \lambda^n)}{m_b} \quad (36)$$

$$A_b^{n+1} = A_b^n - I_b^{-1}[r_b]C \cdot (\lambda^{n+1} - \lambda^n) \quad (37)$$

$$D_a^{n+1\cdot correction} = D_a^{n\cdot correction} + C \begin{pmatrix} \lambda_c^{n+1} - \lambda_c^n \\ 0 \\ 0 \end{pmatrix} \quad (38)$$

$$A_a^{n+1\cdot correction} = A_a^{n\cdot correction} + I_a^{-1}[r_a]C \begin{pmatrix} \lambda_c^{n+1} - \lambda_c^n \\ 0 \\ 0 \end{pmatrix} \quad (39)$$

$$D_b^{n+1\cdot correction} = D_b^{n\cdot correction} - C \begin{pmatrix} \lambda_c^{n+1} - \lambda_c^n \\ 0 \\ 0 \end{pmatrix} \quad (40)$$

$$A_b^{n+1\cdot correction} = A_b^{n\cdot correction} - I_b^{-1}[r_b]C \begin{pmatrix} \lambda_c^{n+1} - \lambda_c^n \\ 0 \\ 0 \end{pmatrix} \quad (41)$$

In this embodiment, equations (38) to (41) are evaluated as vector scalar operations.

At step S8-10, solver 244 determines whether all collision contacts have been processed. The processing at steps S8-2 to S8-10 is repeated until all collision contacts have been processed in the way described above.

Referring again to FIG. 7, at step S7-4, solver 244 performs processing to iteratively solve the linear algebraic system defined by equations (22) and (23) above for joints.

Figure 9:
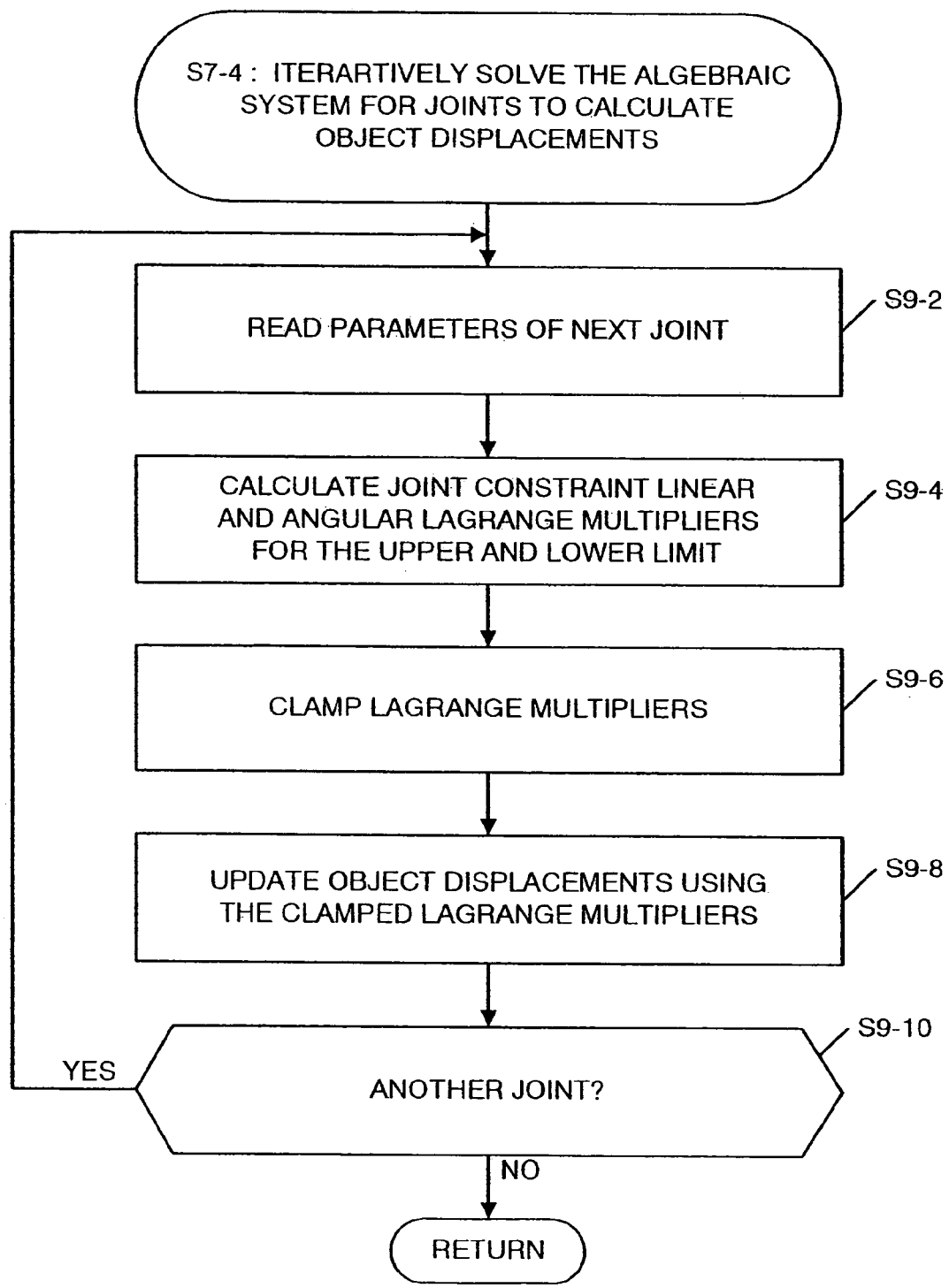
FIG. 9 shows the processing operations performed at step S7-4 in FIG. 7.

FIG. 9 shows the processing operations performed at step S7-4 by solver 244 in this embodiment. This processing is the same as the processing at step S7-2 described above with the exception of the data compilation performed at step S9-2 and the mathematical operations performed at steps S9-4, S9-6 and S9-8.

More particularly, in this embodiment at step S9-4, solver 244 calculates values for the Lagrange multipliers using the following equations:

$$\lambda_{lin\text{-}max}^{n+1} = \{\lambda_{lin}^n - L^T((D_a + r_a \times A_a) - (D_b + r_b \times A_b))\} - B_{lin\text{-}max} \quad (42)$$

$$\lambda_{lin\text{-}min}^{n+1} = \{\lambda_{lin}^n - L^T((D_a + r_a \times A_a) - (D_b + r_b \times A_b))\} - B_{lin\text{-}min} \quad (43)$$

$$\lambda_{ang\text{-}max}^{n+1} = \{\lambda_{ang}^n - T^T(A_a - A_b)\} - B_{ang\text{-}max} \quad (44)$$

$$\lambda_{ang\text{-}min}^{n+1} = \{\lambda_{ang}^n - T^T(A_a - A_b)\} - B_{ang\text{-}min} \quad (45)$$

Within equations (42) and (43) above, the terms in { } brackets are the same and are evaluated only once. Similarly the terms in { } brackets in equations (44) and (45) are the same and are evaluated only once.

When performing the first iteration of step S9-4, the values of $D_a$, $A_a$, $D_b$ and $A_b$ are the values previously calculated at step S7-2, while all values of $\lambda_n$ are zero.

The equations used by solver 244 at step S9-6 comprise the following in this embodiment:

$$\text{if } (\lambda_{x,y,z\text{-}max}^{n+1})_{ang\&lin} < 0 \text{ then } \lambda_{x,y,z\text{-}max}^{n+1} = 0 \quad (46)$$

$$\text{if } (\lambda_{x,y,z\text{-}min}^{n+1})_{ang\&lin} > 0 \text{ then } \lambda_{x,y,z\text{-}min}^{n+1} = 0 \quad (47)$$

$$\lambda_{lin}^{n+1} = \lambda_{lin\text{-}min}^{n+1} + \lambda_{lin\text{-}max}^{n+1} \quad (48)$$

$$\lambda_{ang}^{n+1} = \lambda_{ang\text{-}min}^{n+1} + \lambda_{ang\text{-}max}^{n+1} \quad (49)$$

The equations used by solver 244 at step S9-8 comprise the following in this embodiment:

$$D_a^{n+1} = D_a^n + L \frac{(\lambda_{lin}^{n+1} - \lambda_{lin}^n)}{m_a} \quad (50)$$

$$A_a^{n+1} = A_a^n + I_a^{-1}[r_a^x]L \cdot (\lambda_{lin}^{n+1} - \lambda_{lin}^n) + I_a^{-1}T(\lambda_{ang}^{n+1} - \lambda_{ang}^n) \quad (51)$$

$$D_b^{n+1} = D_b^n - L \frac{(\lambda_{lin}^{n+1} - \lambda_{lin}^n)}{m_b} \quad (52)$$

$$A_a^{n+1} = A_a^n - I_b^{-1}[r_b^x]L \cdot (\lambda_{lin}^{n+1} - \lambda_{lin}^n) - I_b^{-1}T(\lambda_{ang}^{n+1} - \lambda_{ang}^n) \quad (53)$$

Referring again to FIG. 7, at step S7-6, solver 244 performs a convergence test. In this embodiment, solver 244 performs processing to determine whether the values of λ calculated for the current iteration differ from the values of λ calculated for the previous iteration by more than a predetermined threshold, in accordance with the following equation:

$$\sum_\lambda \frac{(\lambda^{n+1} - \lambda^n)^2}{\lambda^{n2}} \leq \text{Threshold} \quad (54)$$

In this embodiment, the threshold employed in Equation (54) is set to $10^{-4}$.

At step S7-8, solver 244 determines whether a predetermined number of iterations of the processing at steps S7-2 to S7-8 have been performed. In this embodiment, solver 244 determines whether 50 iterations have been performed.

The processing at steps S7-2 to S7-8 is repeated until it is determined at step S7-8 that the predetermined number of iterations has been performed or until it is determined at step S7-6 that convergence has been achieved.

Referring again to FIG. 4, at step S4-10, object dynamics updater 250 updates the linear and angular displacements (which implicitly define the linear and angular velocities) and the linear and angular positions of each body. In this embodiment, the processing at step S4-10 is performed by evaluating equations (10) to (13) above using the values of $D_{action}$ and $A_{action}$ calculated at step S4-4 and the values of $D_{reaction}$ and $A_{reaction}$ calculated at step S4-8.

At step S4-12, game logic implementer 210 updates the game logic as a result of the user-input instructions read at step S4-2 and the changes in positions and velocities of the objects calculated at step S4-10.

At step S4-14, renderer 260 performs processing to render an image of the 3D objects and to output the image data for display to the user on display device 202, while sound controller 270 performs processing to generate and output sounds to the user. The processing performed by renderer 260 and 270 takes account of the updates to the object parameters performed by object dynamic updater 250 at step S4-10. In this embodiment, the processing at step S4-14 is performed in a conventional manner and accordingly details will not be provided here.

At step S4-16, game logic implementer 210 determines whether the game has finished. Processing at steps S4-2 to S4-16 is repeated until the game has finished.

Many modifications and variations can be made to the embodiment described above.

For example, the processing described above to calculate the linear and angular displacements of the objects at step S4-8 can be used to calculate linear and angular displacements when the constraints are defined in terms of the velocities of the objects instead of the positions of the objects.

In the embodiment described above, two sets of boundary conditions are defined for collisions—that is, B1 in Equation (14) and B2 in Equation (15). Processing is then performed at steps S8-4 to S8-8 taking into account both of these boundary conditions. However, it is not essential to use the boundary conditions defined by Equation (14), with the results that the processing to evaluate Equation (26) at step S8-4, the processing to evaluate Equation (30) at step S8-6 and the processing to evaluate equations (38) to (41) at step S8-8 are omitted. In addition, in the processing at step S8-4 and step S8-8, all correction terms are omitted.

The convergence test performed at step S7-6 in the embodiment above may be replaced with a convergence test to determine whether the difference between the displacements of the objects calculated for the current iteration differ from the displacements for the objects calculated for the previous iteration by more than a predetermined threshold. In this case, instead of summing the difference between the λ components in accordance with Equation (54), the difference between the displacement components would be summed and tested against a threshold. Alternatively, the convergence test at step S7-6 may be omitted. By omitting the convergence test, the processing time required to perform the convergence test could be utilised carrying out additional iterations of the processing at steps S7-2 and S7-4.

In the embodiment described above, the processing performed at steps S7-2 to S7-4 utilises a projected successive over-relaxation method. However, this is not essential and other types of methods may be used. More particularly, the processing at step S7-2 and the processing at step S7-4 can solve $JM^{-1}J^T \underline{\lambda} \Delta t^2 \geq \underline{B}$ using an iterative method but with different projection rules.

More particularly, the purpose of the iterative method is to achieve:

$$\lim \lambda^{n+1} = \lambda^n \quad n \to \infty \quad B - JM^{-1}J^T\lambda^n = 0 \quad (55)$$

where $B - JM^{-1}J^T\lambda = 0$ can be called the residual.

In the processing performed at step S8-4 above, to update $\underline{\lambda}$, each component of $\underline{\lambda}$ is updated independently, that is to say, each component is updated based on the value of that component obtained from the previous iterative cycle, but no other component values. The updating of the components of each $\underline{\lambda}$ vector is therefore performed using a so-called Jacobi method.

On the other hand, the processing of the respective contact constraints at steps S8-2 to S8-10 is performed using a so-called Gauss-Seidel method because the processing for each respective contact is performed in dependence upon displacements calculated for bodies in previous contact constraint cycles.

In the processing at steps S8-4, it is possible to control the amount by which each vector $\underline{\lambda}^{n+1}$ is changed relative to $\underline{\lambda}^n$ by controlling the amount added to $\underline{\lambda}^n$ to update $\underline{\lambda}^{n+1}$. This is done by controlling the effect of the residual on the update of $\underline{\lambda}$ for each iterative step. As a result, it is possible to control the convergence rate of $\underline{\lambda}$. This is achieved by using a relaxation parameter $\gamma$.

A global description of the method can therefore be defined by Equation (56), where $\gamma$ is a relaxation term with $0<\gamma<2$ and A is a pre-conditioning matrix.

$$\lambda^{n+1} = \lambda^n + \gamma A(B - JM^{-1}J^T\lambda^n), \text{ where } \lambda \text{ is a vector} \begin{pmatrix} \lambda_n \\ \lambda_u \\ \lambda_v \end{pmatrix} \quad (56)$$

For a per vector solver like the one in the embodiment described above:

For $\gamma=1$, $A=\text{Diag}^{-1}$ the iterations are either pure Gauss-Seidel or pure Jacobi methods, depending on which series of cycles is being considered (vector component, or contact constraint cycles).

For $0<\gamma<1$, and $A=\text{Diag}^{-1}$ the iteration is a successive-under-relaxation (SUR) iteration, where the $\gamma$ term results in a reduced effect of the residual on the amount by which $\underline{\lambda}^{n+1}$ is changed relative to $\underline{\lambda}^n$.

For $1<\gamma<2$, $A=\text{Diag}^{-1}$ the iteration is a successive over-relaxation (SOR) iteration, where the $\gamma$ term results in an increased effect of the residual on the amount by which $\underline{\lambda}^{n+1}$ is changed relative to $\underline{\lambda}^n$, which increases the convergence rate.

Higher convergence rates per vector can be achieved with a better A pre-conditioning.

Exact component:

$$\begin{pmatrix} GS \\ SOR \\ SUR \end{pmatrix}$$

per vector: can be achieved using $$\begin{bmatrix} A' & \\ & A' \end{bmatrix} A' = J_i M^{-1} J_i^T$$

by using the converse diagonal block $A'^{-1} = (J_i M^{-1} J_i^T)^{-1}$.

Exact component calculation per vector can then be achieved.

Joint Constraints

Joints can have six degrees of freedom, potentially, and thus can be more complex than position constraints. A joint has a position and an orientation, each with three degrees.

The most constraining situation for a joint is when all degrees of freedom ("DOF") are removed, i.e., a "6 DOF locked" joint. This will be the case used in describing how boundary conditions for joints are calculated. An example of a 6 DOF locked joint is illustrated in FIG. 12.

In one example: the constraints of the joint are defined by one linear constraint, wherein the two positions of the joints are locked to be equal, i.e., 3 DOF linear locked, represented by:

$$\vec{G}_a + \vec{r}_a = \vec{G}_b + \vec{r}_b \text{ and}$$

two angular constraints wherein the two frames are equal, i.e., 3 DOF angular locked, represented by:

$$\overline{F}_a = \overline{F}_b$$

These constraints can be linearized to be solved in the same way as contact constraints are solved, such as by using a position-based solver, or perhaps an angle-based solver that solves with angles instead of angular velocity. A linear constraint equation (which is similar to the contact condition) might be as follows:

$$L^T \cdot \begin{pmatrix} 0 \\ 0 \\ 0 \end{pmatrix} \leq L^T \cdot ((\vec{G}_a^{n+1} + \vec{r}_a^{n+1}) - (\vec{G}_a^{n+1} + \vec{r}_a^{n+1})) \leq L^T \begin{pmatrix} 0 \\ 0 \\ 0 \end{pmatrix}$$

Equality is where the two boundaries are equal.

The L frame evolves with the parent object, but is used in world space. Repeat the same for $F_a$ and $F_b$.

As for the angular constraint equation, the angular projection frame is not as straightforward as L. That frame, called T here can be calculated by quaternion decomposition. The relative quaternion from B–A is given by:

$$q_{rel} = \overline{q}_a \cdot q_b$$

where $q_a$ is the quaternion form of $F_a$ and $q_b$ is the quaternion form of $F_b$. The derivative of the relative quaternion produces:

That can be expressed as:

$$\dot{q}_{rel} = \frac{1}{2} q_a \cdot \begin{pmatrix} \omega_b - \omega_a \\ 0 \end{pmatrix} \cdot q_b$$

$$\dot{q}_{rel} = J\omega q \cdot \begin{pmatrix} \omega_b - \omega_a \\ 0 \end{pmatrix}$$

where $\omega_b$ and $\omega_a$ are the angular velocities of object B and object A, respectively.

$J\omega q$ can be called the relative quaternion Jacobian matrix and is a 4×4 matrix. Only the first 3 lines of the $J\omega q$ are required to constrain the 3 dimension of the angular freedom.

$$J\omega q = \begin{bmatrix} [T^T] \\ x\ x\ x \end{bmatrix} \begin{bmatrix} q_i \\ q_j \\ q_k \\ q_r \end{bmatrix}$$

the rate of change of a quaternion given an angular velocity is given by:

$$\begin{bmatrix} \dot{q}_i \\ \dot{q}_j \\ \dot{q}_r \end{bmatrix} = T^T \Delta\omega_{ab}$$

imaginary forms of $\dot{q}_{rel}$

The meaning of this equation is if we rotate the child quaternion with an angular velocity $\Delta\omega_{ab}$ such that $$\begin{bmatrix} q_i \\ q_j \\ q_r \end{bmatrix} = T^T \Delta\omega_{ab}$$

⇒ Then the child quaternion will match the parent joint quaternion. ⇔ $F_a = F_b$.

The final angular constraint becomes:

From $q_{rel}$ $$\begin{pmatrix} q_i \\ q_j \\ q_k \end{pmatrix} \leq T^T \cdot (\Delta\omega_{ab}) \leq \begin{pmatrix} q_i \\ q_j \\ q_k \end{pmatrix}$$

The two limits are equal if the DOF are locked, thus achieving equality.

Following the same logic as the one described in the contact case but with 6 DOF: the joint constraint becomes:

$$\begin{pmatrix} L^T \cdot (\Delta P + \Delta V + \Delta F) \\ T^T \cdot (\Delta\omega + \Delta\tau) + q_{rel} \end{pmatrix} \leq J_j r^{-1} J_k^T \lambda \leq \begin{pmatrix} L^T \cdot (\Delta P + \Delta V + \Delta F) \\ T^T \cdot (\Delta\omega + \Delta\tau) + q_{rel} \end{pmatrix}$$

Where
 $\Delta P$ is position error,
 $\Delta V$ is velocity displacement,
 $\Delta F$ is force displacement,
 $\Delta\omega$ is angular displacement,
 $\Delta\tau$ is torque displacement,
 $q_{rel}$ is angular position error.

The analogy is
 $\Delta P \Leftrightarrow \Delta\alpha$ with $q_{rel} = T^T \Delta\alpha$
 $\Delta V \Leftrightarrow \Delta\omega$
 $\Delta F \Leftrightarrow \Delta\tau$.

In another approach to describing this:

$$J = \begin{bmatrix} \begin{bmatrix} L^T & L^T [r_a]^T \\ O_{3\times 3} & T^T \end{bmatrix} \begin{bmatrix} -L^T & -L^T [r_b]^T \\ O_{3\times 3} & -T^T \end{bmatrix} \end{bmatrix}$$

⇒ To match the solver notation;

$B_{lim\ max} = -L^T(\Delta P + \Delta V + \Delta F) \Rightarrow \lambda_{lim\ max} \geq 0$ $B_{lim\ min} = L^T(\Delta P + \Delta V + \Delta F) \Rightarrow \lambda_{lim\ min} \leq 0$ $\lambda_{lim} = \lambda_{max} + \lambda_{min}$ as only one of the lambdas can be non-zero.

$B_{ang\ max} = -q_{rel} - T^T(\Delta\omega + \Delta\tau) = -T^T(\Delta\alpha + \Delta\omega + \Delta\tau)$ (Access to angular error ($T^T \Delta\alpha$ is mapped to $q_{rel}$)

$B_{ang\ min} = q_{rel} + T^T(\Delta\omega + \Delta\tau)$

Collision and joint constraints are described in the embodiment above. However, the techniques used above are not limited to these cases. While the invention has been described with respect to exemplary embodiments, one skilled in the art will recognize that numerous modifications are possible. For example, the processes described herein may be implemented using hardware components, software components, and/or any combination thereof. As another example, different models can be created, for example, to have friction constraints in joints or angular constraints in contacts to achieve rolling and spinning friction. Other kinds of constraints can be linearly added to the contacts and/or joints. In addition, the drive applied to a rigid body can be modelled as a constraint, and the drive can be animated using typical animation data. Other modifications are, of course, possible. Thus, although the invention has been described with respect to exemplary embodiments, it will be appreciated that the invention is intended to cover all modifications and equivalents within the scope of the following claims.

What is claimed is:

1. In an evaluator that evaluates a plurality of rigid bodies defined by values stored in a memory device, a method of calculating simulated motion of the plurality of rigid bodies that would occur given representations of positions of the plurality of rigid bodies in a model space at a first time, data representing behaviors of the plurality of rigid bodies in the model space, and parameters representing simulated forces that would be acting on the rigid bodies, the method comprising:
(a) receiving in a processor, as input to the evaluator, constraint signals representing constraint parameters defining at least one constraint, wherein the at least one constraint is a condition limiting a motion parameter of at least one of the plurality of rigid bodies;
(b) for a given constraint of the at least one constraint, calculating a value of a reaction parameter affecting the motion parameter using data defining a previous value of the motion parameter, and using data defining a previous value of the reaction parameter;
(c) updating the value of the motion parameter using the calculated value of the reaction parameter, data defining the given constraint and the previous value of the motion parameter;
(d) repeating steps (b) and (c) for each constraint; and
(e) outputting the motion parameter of at least one of the plurality of rigid bodies as a representation of simulated motion of at least one of the plurality of rigid bodies.

2. A method according to claim 1, wherein the value of the motion parameter is updated using the calculated value of the reaction parameter, a transpose of the data defining the constraint, and a previous value of the motion parameter.

3. A method according to claim 1, wherein the reaction parameter comprises a Lagrange multiplier.

4. A method according to claim 1, wherein each constraint comprises one of a contact constraint and a joint constraint.

5. A method according to claim 1, wherein the motion parameter comprises one of a position parameter, a displacement parameter and a velocity parameter.

6. A method of processing data defining a plurality of objects, positions and velocities of the plurality of objects, and a plurality of constraints on the plurality of objects, to calculate simulated motion of the objects at different times, the method comprising:
in a processor, iteratively evaluating an equation defining a reaction to a constraint of the plurality of constraints as a function of a motion parameter of the objects and an equation defining the motion parameter of the objects as a function of the reaction,
wherein the equation defining the reaction is evaluated for a given iteration using a value of the motion parameter calculated on a previous iteration by evaluating the equation defining the motion parameter; and
outputting the motion parameter of the objects as a representation of simulated motion of the objects.

7. A method according to claim 6, wherein each iteration to evaluate the equation defining the reaction and the equation defining the motion parameter is performed for a respective one of the plurality of constraints.

8. A method according to claim 6, wherein each constraint comprises one of a contact and a joint between the objects.

9. Processing apparatus operable to calculate a motion parameter of a plurality of rigid bodies, the apparatus comprising:
a data store to store parameters defining an initial state of a plurality of bodies and data defining a plurality of constraints constraining the motion of the bodies;
a motion constraint solver operable to calculate at least one of a position parameter and a velocity parameter of each body by performing processing for each constraint of the plurality of constraints separately to iteratively update the position parameter or the velocity parameter of each body of the plurality of bodies such that each iteration is performed by updating previously calculated parameters, and to output the motion parameter of the plurality of rigid bodies as a representation of simulated motion of the plurality of rigid bodies.

10. Apparatus according to claim 9, wherein the motion constraint solver is operable to evaluate at least two equations on each iteration:
one of the equations defining a reaction to each constraint of the plurality of constraints as a function of at least one of the position parameter and the velocity parameter; and
the other of the equations defining the at least one of the position parameter and the velocity parameter as a function of the reaction to each constraint of the plurality of constraints.

11. A computer-readable medium having stored thereon computer program instructions, which when executed, provide an evaluator that evaluates a plurality of rigid bodies defined by values stored in a memory device, a method of calculating simulated motion of the plurality of rigid bodies that would occur given representations of positions of the plurality of rigid bodies in a model space at a first time, data representing behaviors of the plurality of rigid bodies in the model space, and parameters representing simulated forces that would be acting on the rigid bodies, the medium comprising:
(a) program code for receiving, as input to the evaluator, constraint signals representing constraint parameters defining at least one constraint, wherein the at least one constraint is a condition limiting a motion parameter of at least one of the plurality of rigid bodies;
(b) program code for calculating, for a given constraint of the at least one constraint, a value of a reaction parameter affecting the motion parameter using data defining a previous value of the motion parameter, and using data defining a previous value of the reaction parameter;
(c) program code for updating the value of the motion parameter using the calculated value of the reaction parameter, data defining the given constraint and the previous value of the motion parameter;
(d) program code for flow control that loops through program code (b) and (c) for each constraint; and
(e) program code for outputting the motion parameter of at least one of the plurality of rigid bodies as a representation of simulated motion of at least one of the plurality of rigid bodies.

* * * * *